(12) United States Patent
Zhuang et al.

(10) Patent No.: US 10,455,593 B2
(45) Date of Patent: Oct. 22, 2019

(54) METHOD AND APPARATUS FOR ALLOCATING ACCESS AND BACKHAUL RESOURCES

(71) Applicant: HUAWEI TECHNOLOGIES CO., LTD., Shenzhen, Guangdong (CN)

(72) Inventors: Hongcheng Zhuang, Shenzhen (CN); Zezhou Luo, Shenzhen (CN); Jun Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 15/879,092

(22) Filed: Jan. 24, 2018

(65) Prior Publication Data

US 2018/0152951 A1 May 31, 2018

Related U.S. Application Data

(63) Continuation of application No. PCT/CN2015/085125, filed on Jul. 25, 2015.

(51) Int. Cl.
*H04W 72/08* (2009.01)
*H04W 16/14* (2009.01)
(Continued)

(52) U.S. Cl.
CPC ......... *H04W 72/085* (2013.01); *H04W 16/14* (2013.01); *H04W 24/02* (2013.01);
(Continued)

(58) Field of Classification Search
CPC ... H04W 72/085; H04W 16/14; H04W 24/02; H04W 28/16; H04W 16/28; H04W 88/08
See application file for complete search history.

(56) References Cited

U.S. PATENT DOCUMENTS

2010/0238826 A1 9/2010 Borran et al.
2012/0282934 A1* 11/2012 Simonsson ............ H04B 7/024
455/446

(Continued)

FOREIGN PATENT DOCUMENTS

CN 102186178 A 9/2011
CN 104113920 A 10/2014
(Continued)

OTHER PUBLICATIONS

International Search Report dated Apr. 27, 2016 in corresponding International Patent Application No. PCT/CN2015/085125.
(Continued)

*Primary Examiner* — Faruk Hamza
*Assistant Examiner* — Tito Q Pham
(74) *Attorney, Agent, or Firm* — Kilpatrick Townsend & Stockton, LLP

(57) ABSTRACT

A method for allocating access and backhaul resources is provided, including: obtaining multiple coordinating sets in a network and a transmission mode corresponding to each coordinating set; determining, according to the multiple coordinating sets and the transmission mode corresponding to each coordinating set, an access and backhaul resource allocation manner corresponding to an optimal network access and backhaul joint utility; and instructing wireless access points in the network to use the access and backhaul resource allocation manner to transmit data to user terminals in the network. This ensures proper and flexible allocation of access and backhaul resources and improves system resource utilization.

17 Claims, 5 Drawing Sheets

(51) Int. Cl.
*H04W 24/02* (2009.01)
*H04W 28/16* (2009.01)
*H04W 16/28* (2009.01)
*H04W 88/08* (2009.01)

(52) U.S. Cl.
CPC ............ *H04W 28/16* (2013.01); *H04W 16/28* (2013.01); *H04W 88/08* (2013.01)

(56) References Cited

U.S. PATENT DOCUMENTS

| | | | |
|---|---|---|---|
| 2013/0039326 A1* | 2/2013 | Kim | H04B 7/024 370/329 |
| 2013/0039349 A1* | 2/2013 | Ebrahimi Tazeh Mahalleh | H04L 1/0013 370/336 |
| 2014/0071841 A1* | 3/2014 | Hu | H04L 5/0035 370/252 |
| 2014/0119321 A1* | 5/2014 | Wang | H04L 5/0048 370/329 |
| 2017/0230868 A1* | 8/2017 | Matsuo | H04W 92/20 |
| 2017/0272219 A1* | 9/2017 | Park | H04W 72/0486 |

FOREIGN PATENT DOCUMENTS

| | | |
|---|---|---|
| CN | 104135315 A | 11/2014 |
| CN | 104284438 A | 1/2015 |
| CN | 104618003 A | 5/2015 |

OTHER PUBLICATIONS

International Search Report dated Apr. 27, 2016, in corresponding International Patent Application No. PCT/CN2015/085125, 7 pgs.
Written Opinion of the International Search Authority dated Apr. 27, 2016, in corresponding International Patent Application No. PCT/CN2015/085125, 3 pgs.
International Search Report dated Apr. 28, 2016, in related International Patent Application No. PCT/CN2015/085126, 7 pgs.
Written Opinion of the International Search Authority dated Apr. 28, 2016, in related International Patent Application No. PCT/CN2015/085126, 4 pgs.

* cited by examiner

US 10,455,593 B2

METHOD AND APPARATUS FOR ALLOCATING ACCESS AND BACKHAUL RESOURCES

CROSS-REFERENCE TO RELATED APPLICATIONS

This application is a continuation of International Patent Application No. PCT/CN2015/085125, filed on Jul. 25, 2015, which is hereby incorporated by reference in its entirety.

TECHNICAL FIELD

The present disclosure relates to the field of communications technologies, and in particular, to a method and an apparatus for allocating access and backhaul resources.

BACKGROUND

To increase a network capacity, small-sized and densely deployed access points in a wireless network are a development trend of the wireless network. An ultra-dense network (Ultra-dense network, UDN) allows access of a user terminal from a place as near as possible, to increase a throughput of the user terminal and a regional throughput of a system.

Dense network deployment means that more wireless access points such as base stations need to be deployed in one coverage area. Consequently, many coverage areas overlap in a network, and a large quantity of user terminals are located in these overlapping areas. Application of a coordinated multipoint transmission/reception (Coordinated Multipoint transmission/reception, CoMP) technology thus becomes more necessary. Coordinated multipoint transmission/reception CoMP is a technology for improving cell edge spectrum efficiency and expanding data coverage. Selection of a coordinating set, transmission points (base stations participating in coordinated transmission/reception), and a coordinated transmission/reception mode determines performance of coordinated transmission/reception. There are two common coordinated multipoint transmission/reception technologies: joint transmission (Joint Transmission) and coordinated beamforming (Coordinated Beamforming). During application of the coordinated beamforming technology, cells participating in coordination need to share information about channels between a user terminal and all these cells. For the joint transmission technology, cells need to share not only channel information but also data information of a user terminal.

On the other hand, in a dense network, constrained by costs and other factors, not every wireless access point (for example, a base station) has an ideal backhaul. Due to the backhaul constraint, flexible use of access and backhaul resources exerts great impact on resource utilization and transmission performance of a system.

Conventionally, allocation of access and backhaul resources is fixed and based on a time domain, and is not adaptive to the dynamic nature of a dense network. In addition, the conventional allocation of access and backhaul resources does not take a data transmission mode of a user terminal into consideration. As a result, system resource utilization and transmission efficiency are decreased.

Therefore, how access and backhaul resources are properly allocated for a user terminal in a network becomes an extremely important problem that needs to be resolved urgently.

SUMMARY

The present invention provides a method and an apparatus for allocating access and backhaul resources, so as to ensure proper allocation of access and backhaul resources and improve system resource utilization.

According to a first aspect, a method for allocating access and backhaul resources, including:

obtaining multiple coordinating sets in a network and a transmission mode corresponding to each coordinating set, where each coordinating set includes at least two wireless access points;

determining, according to the multiple coordinating sets and the transmission mode corresponding to each coordinating set, an access and backhaul resource allocation manner corresponding to an optimal network access and backhaul joint utility; and instructing wireless access points in the network to use the access and backhaul resource allocation manner to transmit data to user terminals in the network.

With reference to the first aspect, in an optional manner, the network access and backhaul joint utility is a sum of the following two:

a sum of data rates that is obtainable in the transmission mode by user terminals of the coordinating sets in the network and a sum of data rates that is obtainable by user terminals out of the coordinating sets in the network.

With reference to the first aspect, in another optional manner, the network access and backhaul joint utility U is calculated in the following manner:

$$U = \sum R_j = \sum_{S \in C} \sum_{j \in K_S} R_j + \sum_{j \notin K_S, \forall S \in C} R_j,$$

where
S is a coordinating set, C is a set of coordinating sets, and $K_S$ is a set of user terminals of the coordinating set S; and
$R_j$ is a data rate obtainable by a user terminal j; and $$\sum_{S \in C} \sum_{j \in K_S} R_j \text{ and } \sum_{j \notin K_S, \forall S \in C} R_j$$

are a total data rate of user terminals of the coordinating sets and a total data rate of user terminals out of the coordinating sets, respectively; and in a transmission mode, a data rate obtainable by a user terminal of a coordinating set, $j \in K_S$, is:
$R_{j,C} = \min(R_{j,C}^{ac,TM}, R_{j,C}^{bh,TM})$, where
$R_{j,C}^{ac,TM} = W\alpha_j^{ac,TM} \log(1+\text{SINR}_j^{ac,TM})$, representing an access data rate obtainable by the user terminal j in the transmission mode;
$R_{j,C}^{bh,TM} = W\alpha_j^{bh,TM} \log(1+\text{SINR}_j^{bh,TM})$, representing a backhaul data rate obtainable by the user terminal j in the transmission mode; and
W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $\text{SINR}_j^{ac,TM}$ and $\text{SINR}_j^{bh,TM}$ represent an access signal-to-noise ratio and a backhaul signal-to-noise ratio of the user terminal j in the transmission mode, respectively; or a data rate obtainable by a user terminal out of the coordinating set, $j \notin K_S$, is:

$R_{j,C} = \min(R_{j,C}^{ac}, R_{j,C}^{bh})$, where $R_{j,C}^{ac} = W\alpha_j^{ac} \log(1+SINR_j^{bh})$, representing an access data rate obtainable by the user terminal j;

$R_{j,C}^{bh} = W\alpha_j^{bh} \log(1+SINR_j^{bh})$, representing a backhaul data rate obtainable by the user terminal j; and W is a system bandwidth; $\alpha_j^{ac}$ and $\alpha_j^{bh}$ represent an access resource ratio and a backhaul resource ratio that are allocated to the user terminal j, respectively; and $SINR_j^{ac}$ and $SINR_j^{bh}$ represent an access signal-to-noise ratio and a backhaul signal-to-noise ratio of the user terminal j, respectively.

With reference to the first aspect and the various manners, in another optional manner, the determining, according to the multiple coordinating sets and the transmission mode corresponding to each coordinating set, an access and backhaul resource allocation manner corresponding to an optimal network access and backhaul joint utility includes:

calculating, for different access and backhaul resource allocation ratios according to the multiple coordinating sets and the transmission mode corresponding to each coordinating set, respective sums of data rates that are obtainable by all user terminals in the network, selecting, for each user terminal, an access and backhaul resource allocation ratio corresponding to the largest sum of data rates that is obtainable by all the user terminals in the network, and determining an access resource and a backhaul resource for each wireless access point according to the access and backhaul resource allocation ratio for each user terminal.

With reference to the first aspect and the various manners, in another optional manner, the determining an access resource and a backhaul resource for each wireless access point according to the access and backhaul resource allocation ratio for each user terminal includes calculating the following resources:

an access resource for a wireless access point i:

$$W \sum_{j \in U_i} \alpha_j^{ac} \Big/ \Big( \sum_{j \in U_i} \alpha_j^{ac} + \sum_{j \in U_i} \alpha_j^{bh} \Big);$$

and a backhaul resource for the wireless access point i:

$$W \sum_{j \in U_i} \alpha_j^{bh} \Big/ \Big( \sum_{j \in U_i} \alpha_j^{ac} + \sum_{j \in U_i} \alpha_j^{bh} \Big),$$

where

W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i.

With reference to the first aspect and the various manners, in another optional manner, the determining an access resource and a backhaul resource for each wireless access point according to the access and backhaul resource allocation ratio for each user terminal includes calculating the following resources:

an access resource for each wireless access point:

$$W \sum_j \alpha_j^{ac} \Big/ \Big( \sum_j \alpha_j^{ac} + \sum_j \alpha_j^{bh} \Big);$$

and a backhaul resource for each wireless access point:

$$W \sum_j \alpha_j^{bh} \Big/ \Big( \sum_j \alpha_j^{ac} + \sum_j \alpha_j^{bh} \Big),$$

where

W is a system bandwidth; and $\alpha_j^{ac}$ and $\alpha_j^{bh}$ represent an access resource ratio and a backhaul resource ratio that are allocated to the user terminal j, respectively.

With reference to the first aspect and the various manners, in another optional manner, the transmission mode of each coordinating set is a beamforming transmission mode, a joint transmission mode, or a dual-connectivity transmission mode.

According to a second aspect, an apparatus for allocating access and backhaul resources is provided, including:

an obtaining module, configured to obtain multiple coordinating sets in a network and a transmission mode corresponding to each coordinating set, where each coordinating set includes at least two wireless access points;

a determining module, configured to determine, according to the multiple coordinating sets and the transmission mode corresponding to each coordinating set, an access and backhaul resource allocation manner corresponding to an optimal network access and backhaul joint utility; and a notification module, configured to instruct wireless access points in the network to use the access and backhaul resource allocation manner to transmit data to user terminals in the network.

With reference to the foregoing second aspect, in an optional manner, the network access and backhaul joint utility is a sum of the following two:

a sum of data rates that is obtainable in the transmission mode by user terminals of the coordinating sets in the network and a sum of data rates that is obtainable by user terminals out of the coordinating sets in the network.

With reference to the second aspect and the various manners, in another optional manner, the network access and backhaul joint utility U is calculated in the following manner:

$$U = \sum R_j = \sum_{S \in C} \sum_{j \in K_S} R_j + \sum_{j \notin K_S, \forall S \in C} R_j,$$

where

S is a coordinating set, C is a set of coordinating sets, and $K_S$ is a set of user terminals of the coordinating set S; and $R_j$ is a data rate obtainable by a user terminal j; and $$\sum_{S \in C} \sum_{j \in K_S} R_j \text{ and } \sum_{j \notin K_S, \forall S \in C} R_j$$

are a total data rate of user terminals of the coordinating sets and a total data rate of user terminals out of the coordinating sets, respectively; and in a transmission mode, a data rate obtainable by a user terminal of a coordinating set, $j \in K_S$, is:

$R_{j,C} = \min(R_{j,C}^{ac,TM}, R_{j,C}^{bh,TM})$, where $R_{j,C}^{ac,TM} = W\alpha_j^{ac,TM} \log(1+SINR_j^{ac,TM})$, representing an access data rate obtainable by the user terminal j in the transmission mode;

$R_{j,C}^{bh,TM} = W\alpha_j^{bh,TM} \log(1+SINR_j^{bh,TM})$, representing a backhaul data rate obtainable by the user terminal j in the transmission mode; and W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $SINR_j^{ac,TM}$ and $SINR_j^{bh,TM}$ represent an access signal-to-noise ratio and a backhaul signal-to-noise ratio of the user terminal j in the transmission mode, respectively; or a data rate obtainable by a user terminal out of the coordinating set, $j \notin K_S$, is:

$R_{j,C} = \min(R_{j,C}^{ac}, R_{j,C}^{bh})$, where $R_{j,C}^{ac} = W\alpha_j^{ac} \log(1+SINR_j^{ac})$ representing an access data rate obtainable by the user terminal j;

$R_{j,C}^{bh} = W\alpha_j^{bh} \log(1+SINR_j^{bh})$, representing a backhaul data rate obtainable by the user terminal j; and W is a system bandwidth; $\alpha_j^{ac}$ and $\alpha_j^{bh}$ represent an access resource ratio and a backhaul resource ratio that are allocated to the user terminal j, respectively; and $SINR_j^{ac}$ and $SINR_j^{bh}$ represent an access signal-to-noise ratio and a backhaul signal-to-noise ratio of the user terminal j, respectively.

With reference to the second aspect and the various manners, in another optional manner, the determining module is specifically configured to:

calculate, for different access and backhaul resource allocation ratios according to the multiple coordinating sets and the transmission mode corresponding to each coordinating set, respective sums of data rates that are obtainable by all user terminals in the network, select, for each user terminal, an access and backhaul resource allocation ratio corresponding to the largest sum of data rates that is obtainable by all the user terminals in the network, and determine an access resource and a backhaul resource for each wireless access point according to the access and backhaul resource allocation ratio for each user terminal.

With reference to the second aspect and the various manners, in another optional manner, the determining an access resource and a backhaul resource for each wireless access point according to the access and backhaul resource allocation ratio for each user terminal includes calculating the following resources:

an access resource for a wireless access point i:

$$W \sum_{j \in U_i} \alpha_j^{ac} \Big/ \Big( \sum_{j \in U_i} \alpha_j^{ac} + \sum_{j \in U_i} \alpha_j^{bh} \Big);$$

and
a backhaul resource for the wireless access point i:

$$W \sum_{j \in U_i} \alpha_j^{bh} \Big/ \Big( \sum_{j \in U_i} \alpha_j^{ac} + \sum_{j \in U_i} \alpha_j^{bh} \Big),$$

where
W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i; or an access resource for each wireless access point:

$$W \sum_j \alpha_j^{ac} \Big/ \Big( \sum_j \alpha_j^{ac} + \sum_j \alpha_j^{bh} \Big);$$

and
a backhaul resource for each wireless access point:

$$W \sum_j \alpha_j^{bh} \Big/ \Big( \sum_j \alpha_j^{ac} + \sum_j \alpha_j^{bh} \Big),$$

where
W is a system bandwidth; and $\alpha_j^{ac}$ and $\alpha_j^{bh}$ represent an access resource ratio and a backhaul resource ratio that are allocated to the user terminal j, respectively.

With reference to the second aspect and the various manners, in another optional manner, the transmission mode of each coordinating set is a beamforming transmission mode, a joint transmission mode, or a dual-connectivity transmission mode.

According to a third aspect, a method for allocating access and backhaul resources is provided, including:

obtaining multiple coordinating sets in a network, where each coordinating set includes at least two wireless access points;

calculating, for combinations of multiple transmission modes of the multiple coordinating sets, a network access and backhaul joint utility of each combination;

select, from multiple network access and backhaul joint utilities obtained by calculation, a combination of transmission modes and an access and backhaul resource allocation manner that are corresponding to an optimal access and backhaul joint utility; and instructing wireless access points in the network to use the selected transmission modes and the selected access and backhaul resource allocation manner to transmit data to user terminals in the network.

With reference to the third aspect and the various manners, in another optional manner, the network access and backhaul joint utility of each combination is a sum of the following two:

a sum of data rates that is obtainable in the transmission mode of the combination by user terminals of the coordinating sets in the network and a sum of data rates that is obtainable by user terminals out of the coordinating sets in the network.

With reference to the third aspect and the various manners, in another optional manner, the network access and backhaul joint utility is calculated in the following manner:

$$U = \sum R_j = \sum_{S \in C} \sum_{j \in K_S} R_j + \sum_{j \notin K_S, \forall S \in C} R_j,$$

where
S is a coordinating set, C is a set of coordinating sets, and $K_S$ is a set of user terminals of the coordinating set S; and
$R_j$ is a data rate obtainable by a user terminal j; and $$\sum_{S \in C} \sum_{j \in K_S} R_j \text{ and } \sum_{j \notin K_S, \forall S \in C} R_j$$

are a total data rate of user terminals of the coordinating sets and a total data rate of user terminals out of the coordinating sets, respectively; and
in a transmission mode, a data rate obtainable by a user terminal of a coordinating set, $j \in K_S$, is:
$R_{j,C} = \min(R_{j,C}^{ac,TM}, R_{j,C}^{bh,TM})$, where
$R_{j,C}^{ac,TM} = W\alpha_j^{ac,TM} \log(1+SINR_j^{ac,TM})$, representing an access data rate obtainable by the user terminal j in the transmission mode;
$R_{j,C}^{bh,TM} = W\alpha_j^{bh,TM} \log(1+SINR_j^{bh,TM})$, representing a backhaul data rate obtainable by the user terminal j in the transmission mode; and
W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $SINR_j^{ac,TM}$ and $SINR_j^{bh,TM}$ represent an access signal-to-noise ratio and a backhaul signal-to-noise ratio of the user terminal j in the transmission mode, respectively; or
a data rate obtainable by a user terminal out of the coordinating set, $j \notin K_S$, is:
$R_{j,C} = \min(R_{j,C}^{ac}, R_{j,C}^{bh})$, where
$R_{j,C}^{ac} = W\alpha_j^{ac} \log(1+SINR_j^{ac})$ representing an access data rate obtainable by the user terminal j;
$R_{j,C}^{bh} = W\alpha_j^{bh} \log(1+SINR_j^{bh})$, representing a backhaul data rate obtainable by the user terminal j; and
W is a system bandwidth; $\alpha_j^{ac}$ and $\alpha_j^{bh}$ represent an access resource ratio and a backhaul resource ratio that are allocated to the user terminal j, respectively; and $SINR_j^{ac}$ and $SINR_j^{bh}$ represent an access signal-to-noise ratio and a backhaul signal-to-noise ratio of the user terminal j, respectively.

With reference to the third aspect and the various manners, in another optional manner, the calculating, for combinations of multiple transmission modes of the multiple coordinating sets, a network access and backhaul joint utility of each combination includes:
calculating, according to different access and backhaul resource allocation ratios of each combination, respective data rates that are obtainable by each user terminal in the network, and selecting, for each user terminal, an access and backhaul resource allocation ratio corresponding to the largest sum of data rates that is obtainable by each user terminal in the network.

With reference to the third aspect and the various manners, in another optional manner, the selecting, from multiple network access and backhaul joint utilities obtained by calculation, a combination of transmission modes and an access and backhaul resource allocation manner that are corresponding to an optimal access and backhaul joint utility includes:
selecting, from multiple maximum obtainable sums of data rates corresponding to the multiple combinations, a combination and an access and backhaul resource allocation ratio for each user terminal that are corresponding to the largest sum of data rates, and determining an access resource and a backhaul resource for each wireless access point according to the access and backhaul resource allocation ratio for each user terminal.

With reference to the third aspect and the various manners, in another optional manner, the determining an access resource and a backhaul resource for each wireless access point according to the access and backhaul resource allocation ratio for each user terminal includes calculating the following resources:
an access resource for a wireless access point i:

$$W \sum_{j \in U_i} \alpha_j^{ac} \bigg/ \left( \sum_{j \in U_i} \alpha_j^{ac} + \sum_{j \in U_i} \alpha_j^{bh} \right);$$

and
a backhaul resource for the wireless access point i:

$$W \sum_{j \in U_i} \alpha_j^{bh} \bigg/ \left( \sum_{j \in U_i} \alpha_j^{ac} + \sum_{j \in U_i} \alpha_j^{bh} \right);$$

where
W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i; or includes:
an access resource for each wireless access point:

$$W \sum_{j} \alpha_j^{ac} \bigg/ \left( \sum_{j} \alpha_j^{ac} + \sum_{j} \alpha_j^{bh} \right);$$

and
a backhaul resource for each wireless access point:

$$W \sum_{j} \alpha_j^{bh} \bigg/ \left( \sum_{j} \alpha_j^{ac} + \sum_{j} \alpha_j^{bh} \right);$$

where
W is a system bandwidth; and $\alpha_j^{ac}$ and $\alpha_j^{bh}$ represent an access resource ratio and a backhaul resource ratio that are allocated to the user terminal j, respectively.

With reference to the third aspect and the various manners, in another optional manner, the network access and backhaul joint utility of each combination is an optimal network access and backhaul joint utility of the combination.

According to a fourth aspect, an apparatus for allocating access and backhaul resources is provided, including:
an obtaining module, configured to obtain multiple coordinating sets in a network, where each coordinating set includes at least two wireless access points;
a calculation module, configured to: calculate, for combinations of multiple transmission modes of the multiple coordinating sets, a network access and backhaul joint utility of each combination; and select, from multiple network access and backhaul joint utilities obtained by calculation, a combination of transmission modes and an access and backhaul resource allocation manner that are corresponding to an optimal access and backhaul joint utility; and a notification module, configured to instruct wireless access points in the network to use the selected transmission modes and the selected access and backhaul resource allocation manner to transmit data to user terminals in the network.

With reference to the fourth aspect and the various manners, in another optional manner, the network access and backhaul joint utility of each combination is a sum of the following two:

a sum of data rates that is obtainable in the transmission mode of the combination by user terminals of the coordinating sets in the network and a sum of data rates that is obtainable by user terminals out of the coordinating sets in the network.

With reference to the fourth aspect and the various manners, in another optional manner, the network access and backhaul joint utility is calculated in the following manner:

$$U = \sum R_j = \sum_{S \in C} \sum_{j \in K_S} R_j + \sum_{j \notin K_S, \forall S \in C} R_j,$$

where
S is a coordinating set, C is a set of coordinating sets, and $K_S$ is a set of user terminals of the coordinating set S; and
$R_j$ is a data rate obtainable by a user terminal j; and $$\sum_{S \in C} \sum_{j \in K_S} R_j \text{ and } \sum_{j \notin K_S, \forall S \in C} R_j$$

are a total data rate of user terminals of the coordinating sets and a total data rate of user terminals out of the coordinating sets, respectively; and in a transmission mode, a data rate obtainable by a user terminal of a coordinating set, $j \in K_S$, is:
$R_{j,C} = \min(R_{j,C}^{ac,TM}, R_{j,C}^{bh,TM})$, where
$R_{j,C}^{ac,TM} = W\alpha_j^{ac,TM} \log(1+SINR_j^{ac,TM})$, representing an access data rate obtainable by the user terminal j in the transmission mode;
$R_{j,C}^{bh,TM} = W\alpha_j^{bh,TM} \log(1+SINR_j^{bh,TM})$, representing a backhaul data rate obtainable by the user terminal j in the transmission mode; and
W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $SINR_j^{ac,TM}$ and $SINR_j^{bh,TM}$ represent an access signal-to-noise ratio and a backhaul signal-to-noise ratio of the user terminal j in the transmission mode, respectively; or
a data rate obtainable by a user terminal out of the coordinating set, $j \notin K_S$, is:
$R_{j,C} = \min(R_{j,C}^{ac}, R_{j,C}^{bh})$, where
$R_{j,C}^{ac} = W\alpha_j^{ac} \log(1+SINR_j^{ac})$ representing an access data rate obtainable by the user terminal j;
$R_{j,C}^{bh} = W\alpha_j^{bh} \log(1+SINR_j^{bh})$ representing a backhaul data rate obtainable by the user terminal j; and
W is a system bandwidth; $\alpha_j^{ac}$ and $\alpha_j^{bh}$ represent an access resource ratio and a backhaul resource ratio that are allocated to the user terminal j, respectively; and $SINR_j^{ac}$ and $SINR_j^{bh}$ represent an access signal-to-noise ratio and a backhaul signal-to-noise ratio of the user terminal j, respectively.

With reference to the fourth aspect and the various manners, in another optional manner, the calculating, for combinations of multiple transmission modes of the multiple coordinating sets, a network access and backhaul joint utility of each combination includes:

calculating, according to different access and backhaul resource allocation ratios of each combination, respective data rates that are obtainable by each user terminal in the network, and selecting, for each user terminal, an access and backhaul resource allocation ratio corresponding to the largest calculated sum of data rates that is obtainable by each user terminal in the network.

With reference to the fourth aspect and the various manners, in another optional manner, the selecting, from multiple network access and backhaul joint utilities obtained by calculation, a combination of transmission modes and an access and backhaul resource allocation manner that are corresponding to an optimal access and backhaul joint utility includes:

selecting, from multiple maximum obtainable sums of data rates corresponding to the multiple combinations, a combination and an access and backhaul resource allocation ratio for each user terminal that are corresponding to the largest sum of data rates, and determining an access resource and a backhaul resource for each wireless access point according to the access and backhaul resource allocation ratio for each user terminal.

With reference to the fourth aspect and the various manners, in another optional manner, the determining an access resource and a backhaul resource for each wireless access point according to the access and backhaul resource allocation ratio for each user terminal includes calculating the following resources:

an access resource for a wireless access point i:

$$W \sum_{j \in U_i} \alpha_j^{ac} \Big/ \Big( \sum_{j \in U_i} \alpha_j^{ac} + \sum_{j \in U_i} \alpha_j^{bh} \Big);$$

and
a backhaul resource for the wireless access point i:

$$W \sum_{j \in U_i} \alpha_j^{bh} \Big/ \Big( \sum_{j \in U_i} \alpha_j^{ac} + \sum_{j \in U_i} \alpha_j^{bh} \Big);$$

where
W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i; or includes:
an access resource for each wireless access point:

$$W \sum_{j} \alpha_j^{ac} \Big/ \Big( \sum_{j} \alpha_j^{ac} + \sum_{j} \alpha_j^{bh} \Big);$$

and
a backhaul resource for each wireless access point:

$$W \sum_j \alpha_j^{bh} \bigg/ \left( \sum_j \alpha_j^{ac} + \sum_j \alpha_j^{bh} \right),$$

where

W is a system bandwidth; and $\alpha_j^{ac}$ and $\alpha_j^{bh}$ represent an access resource ratio and a backhaul resource ratio that are allocated to the user terminal j, respectively.

With reference to the fourth aspect and the various manners, in another optional manner, the network access and backhaul joint utility of each combination is an optimal network access and backhaul joint utility of the combination.

According to the method and the apparatus for allocating access and backhaul resource provided in the present invention, an access and backhaul resource allocation manner corresponding to an optimal network access and backhaul joint utility is determined according to the multiple coordinating sets and the transmission mode corresponding to each coordinating set. This ensures proper and flexible allocation of access and backhaul resources and improves system resource utilization.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

A wireless communications network generally includes a wireless access point, a wireless access point controller, and a user terminal, or includes only a wireless access point and a user terminal. The wireless access point may be a base station, an access point AP (Access Point), a transmission point, or the like. The wireless communications network may be a cellular mobile communications network such as a WCDMA (Wideband Code Division Multiple Access) or LTE (Long Term Evolution) network, or may be a WLAN (wireless local area network), a future network, or the like. The following embodiments are described by using a cellular mobile communications network as an example, where a wireless access point is a base station, and a wireless access point controller is a base station controller.

In a specific embodiment below, a method for selecting a transmission mode according to the present invention is described in detail by using a determined coordinating set as an example. The coordinating set may include multiple wireless access points that serve one or more user terminals. A cellular mobile communications network is used as an example. The method may be executed by a base station, or executed by a base station controller, or executed by a separate controller. The controller may be a function entity that is integrated into another network element such as an MME (Mobility Management Element).

Figure 1:
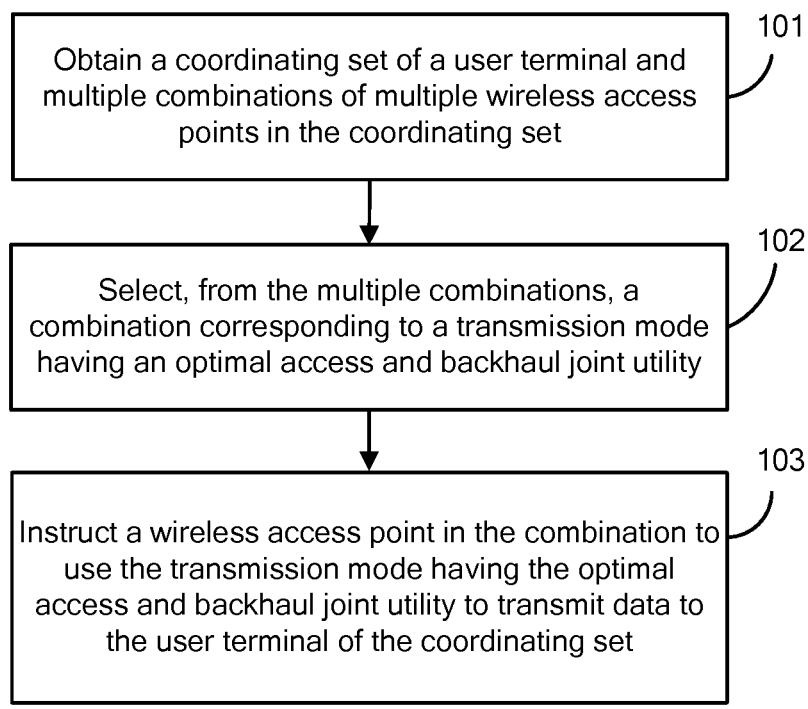
FIG. 1 is a flowchart of a method for selecting a transmission mode according to an embodiment of the present invention.

Referring to FIG. 1, the method for selecting a transmission mode mainly includes the following steps.

101. Obtain a coordinating set of a user terminal and multiple combinations of multiple wireless access points in the coordinating set.

The obtaining a coordinating set of a user terminal is determining which wireless access points can be used as wireless access points in the coordinating set. The following two examples are used for description.

1.1. The user terminal measures pilot signal strengths such as RSRPs (Reference Signal Receiving Power) of a serving cell and neighboring cells, and adds wireless access points whose pilot signal strength is greater than a preset threshold to the coordinating set.

1.2. The user terminal measures interference received from neighboring cells, for example, SINR (Signal to Interference plus Noise Ratio) or another parameter used, and adds wireless access points whose interference strength is greater than a preset threshold to the coordinating set.

In the foregoing two methods, the user terminal may determine which wireless access points such as base stations can be added to the coordinating set, and then report information about the coordinating set to a base station or a controller. Alternatively, the user terminal may report the measured pilot signal strengths or interference strengths to a base station or a controller, and the base station or the controller determines which base stations can be added to the coordinating set. The controller may be a separate apparatus such as a base station controller, or may be a function entity that is integrated into a base station or another network element such as an MME.

In addition, only one of the foregoing two methods may be used, or the two methods may be used simultaneously. That is, all wireless access points whose pilot signal strength and/or interference strength are/is greater than the preset threshold are added to the coordinating set.

Further, if there are multiple user terminals in a network, coordinating sets of the multiple user terminals are separately determined, and user terminals having a same coordinating set are determined as user terminals of the coordinating set. For example, if a coordinating set of a user terminal 1 is (base station 1, base station 2, base station 3), a coordinating set of a user terminal 2 is (base station 2, base station 3, base station 4), and a coordinating set of a user terminal 3 is (base station 3, base station 2, base station 1), the user terminals 1 and 3 are user terminals of the coordinating set (base station 1, base station 2, base station 3).

Base stations may directly exchange coordinating set information of user terminals served by the base stations, so as to determine user terminals of a same coordinating set. Alternatively, base stations report coordinating set information of user terminals served by the base stations to one of the base stations or the foregoing controller, and the base station or the controller determines user terminals of a same coordinating set.

In the foregoing step, a coordinating set and a user terminal of the coordinating set are finally determined, and the following steps are performed for the coordinating set. If there are multiple coordinating sets, the following steps are performed for each of the coordinating sets.

In addition, the multiple combinations of the multiple wireless access points in the coordinating set are obtained.

For the user terminal of the coordinating set, which base stations participate in data transmission and which transmission mode is best to be used need to be determined. Therefore, various combinations of the multiple wireless access points in the coordinating set are first determined.

For example, there are three base stations in a coordinating set, which are base stations 1, 2, and 3, respectively, and combinations of the multiple base stations in the coordinating set include seven combinations in total, which are {base station 1}, {base station 2}, {base station 3}, {base station 1, base station 2}, {base station 1, base station 3}, {base station 2, base station 3}, and {base station 1, base station 2, base station 3}. The combinations including only one base station, which are {base station 1}, {base station 2}, and {base station 3}, correspond to a non-coordinated transmission mode. That is, each base station separately serves its user terminal and does not need cooperation of another base station. The other combinations including two or more base stations correspond to a coordinated transmission mode or a non-coordinated transmission mode.

In the foregoing embodiment, some combinations may be selected as needed. For example, the combinations including only one base station, namely, {base station 1}, {base station 2}, and {base station 3}, are excluded, and only the combinations {base station 1, base station 3}, {base station 2, base station 3}, and {base station 1, base station 2, base station 3}, that is, the combinations including two or more base stations, are retained. This is not limited by the present invention.

This step may also be completed by a base station or a controller.

102. Select, from the various combinations, a combination corresponding to a transmission mode having an optimal access and backhaul joint utility. A specific procedure is as follows:

2.1. Obtain an access capability and a backhaul capability of each wireless access point.

The access capability includes at least one parameter such as an available access resource, an available access capacity, and an access delay, and the backhaul capability includes at least one parameter such as an available backhaul resource, an available backhaul capacity, and a backhaul delay. The obtaining step may be completed by a base station or a controller. If the obtaining step is completed by a base station, an access capability and a backhaul capability of another base station in a combination may be obtained by using an interface between base stations, such as an X2 interface. Alternatively, an access capability and a backhaul capability of each base station may be obtained by a controller. The controller may be a base station controller. If the controller is a function entity, for example, located in a core network device, such as an MME, the obtaining may be performed by using an interface between a base station and a core network, such as an S1 interface.

The following embodiment is described by using an example in which an access capability and a backhaul capability are an available access resource and an available backhaul resource, respectively. For example, an access subchannel set and a backhaul subchannel set that are available to each wireless access point are used as the access capability and the backhaul capability.

2.2. Calculate, for each combination according to an access capability and a backhaul capability of a wireless access point in the combination, access and backhaul joint utilities of the combination in various transmission modes respectively, to obtain access and backhaul joint utilities of the multiple combinations in different transmission modes.

For example, there are four combinations of base stations in the coordinating set. For each combination, if there are three transmission modes, access and backhaul joint utilities of the three transmission modes are calculated separately. Therefore, three access and backhaul joint utilities can be obtained for one combination, and 12 access and backhaul joint utilities can be obtained by calculation for the four combinations.

2.3. Select the optimal access and backhaul joint utility from all the obtained access and backhaul joint utilities, and determine the transmission mode and the combination that are corresponding to the optimal access and backhaul joint utility.

For example, an optimal access and backhaul joint utility can be determined from the foregoing obtained 12 access and backhaul joint utilities, and a transmission mode used with the optimal access and backhaul joint utility and a combination corresponding to the optimal access and backhaul joint utility are determined.

Alternatively, another manner may be used to select the transmission mode and the combination that are corresponding to the optimal access and backhaul joint utility in the foregoing step 2.2 and step 2.3. That is, for each combination, if there are three transmission modes, access and backhaul joint utilities of the three transmission modes are calculated separately, and a transmission mode that is corresponding to an optimal access and backhaul joint utility of the combination is determined. If there are four combinations, transmission modes corresponding to four optimal access and backhaul joint utilities can be obtained, and then an optimal access and backhaul joint utility is selected from the four optimal access and backhaul joint utilities. In this case, a transmission mode and a combination that are corresponding to the optimal access and backhaul joint utility are also determined. For this method, reference may be made to the following step 3.1 to step 3.3.

3.1. This step is the same as step 2.1, and details are not further described.

3.2. Calculate, for each combination according to an access capability and a backhaul capability of a wireless access point in the combination, access and backhaul joint utilities of the combination in different transmission modes respectively, and determine a transmission mode that is corresponding to an optimal access and backhaul joint utility of the combination.

3.3. Select, from transmission modes that are corresponding to multiple optimal access and backhaul joint utilities of the multiple combinations, the combination corresponding to the transmission mode having the optimal access and backhaul joint utility.

The access and backhaul joint utility in this embodiment is an end-to-end (that is, from a terminal to a gateway) comprehensive performance indicator of an access link and a backhaul link. Different performance indicators such as a data transmission rate obtainable by a user terminal or a service delay of a user terminal may be selected. The following embodiment is described by using the data transmission rate obtainable by the user terminal as an example. The access and backhaul joint utility U may be calculated by using the following formula:

$$U = \sum_{k \in K_S} R_{k,C},$$

where
S is a set of combinations of a coordinating set; C is a combination of the coordinating set; $K_S$ is a set of user terminals of the coordinating set; and $R_{k,C}$ is an end-to-end (access and backhaul) data rate of a user terminal k in a coordinated transmission mode in the combination C, where
$R_{k,C}$=min $(R_{k,C}{}^{ac}, R_{k,C}{}^{bh})$, where $$R_{k,C}^{ac} = \sum_{n \in N^{ac}} \alpha_{k,n}^{ac} \log(1 + SINR_{k,n}^{ac}),$$

representing an access data rate obtainable by the user terminal k in the transmission mode;

$$R_{k,C}^{bh} = \sum_{n \in N^{bh}} \alpha_{k,n}^{bh} \log(1 + SINR_{k,n}^{bh}),$$

representing a backhaul data rate obtainable by the user terminal k in the transmission mode; and
$N^{ac}$ and $N^{bh}$ represent an access subchannel set and a backhaul subchannel set that are available to the combination C, respectively; $SINR_{k,n}{}^{ac}$ and $SINR_{k,n}{}^{bh}$ represent signal-to-noise ratios of the user terminal k on an access subchannel n and a backhaul subchannel n, respectively; and $\alpha_{k,n}{}^{ac}=1$ indicates that the access subchannel n is allocated to the user terminal k, and $\alpha_{k,n}{}^{bh}=1$ indicates that the backhaul subchannel n is allocated to the user terminal k, where, on the contrary, $\alpha_{k,n}{}^{ac}=0$ indicates that the access subchannel n is not allocated to the user terminal k, and $\alpha_{k,n}{}^{bh}=0$ indicates that the backhaul subchannel n is not allocated to the user terminal k.

In the foregoing calculation process, different optimization algorithms may be used, so that the U value is the largest in the transmission mode. In this case, allocation of access and backhaul resources, that is, allocation of access subchannels and backhaul subchannels, for the terminals can be determined.

Calculation of $R_{k,C}$ includes that for a coordinated transmission mode and that for a non-coordinated transmission mode. In the foregoing embodiment relating to combinations of base stations, for the combinations {base station 1}, {base station 2}, and {base station 3}, the calculation for a non-coordinated transmission mode is used, because there is only one base station. For the combinations including two or more base stations, which are {base station 1, base station 2}, {base station 1, base station 3}, {base station 2, base station 3}, and {base station 1, base station 2, base station 3}, the calculation for a coordinated transmission mode and the calculation for a non-coordinated transmission mode are used. Certainly, alternatively, only the calculation for a coordinated transmission mode may be used as needed. Respective descriptions are given below.

In a non-coordinated transmission mode, an end-to-end data rate $R_{k,C}$ of the user terminal k is:
$R_{k,C}{}^{NC}$=min $(R_{k,C}{}^{NC,ac}, R_{k,C}{}^{NC,bh})$, where $$R_{k,C}^{NC,ac} = \sum_{n \in N^{ac}} \alpha_{k,n}^{ac} \log(1 + SINR_{k,n}^{NC,ac}),$$

representing an access data rate obtainable by the user terminal k in the non-coordinated transmission mode;

$$R_{k,C}^{NC,bh} = \sum_{n \in N^{bh}} \alpha_{k,n}^{bh} \log(1 + SINR_{k,n}^{NC,bh}),$$

representing a backhaul data rate obtainable by the user terminal k in the non-coordinated transmission mode; and
$N^{ac}$ and $N^{bh}$ represent an access subchannel set and a backhaul subchannel set that are available to, that is, an access capability and a backhaul capability of, the combination C, respectively; $SINR_{k,n}{}^{ac}$ and $SINR_{k,n}{}^{bh}$ represent signal-to-noise ratios of the user terminal k on an access subchannel n and a backhaul subchannel n, respectively; and $\alpha_{k,n}{}^{ac}=1$ indicates that the access subchannel n is allocated to the user terminal k, and $\alpha_{k,n}{}^{bh}=1$ indicates that the backhaul subchannel n is allocated to the user terminal k, where, on the contrary, $\alpha_{k,n}{}^{ac}=0$ indicates that the access subchannel n is not allocated to the user terminal k, and $\alpha_{k,n}{}^{bh}=0$ indicates that the backhaul subchannel n is not allocated to the user terminal k.

Similarly, in a coordinated transmission mode, end-to-end data rates of the user terminal k in a coordinated beamforming transmission mode and a joint transmission mode are:
$R_{k,C}{}^{CB}$=min $(R_{k,C}{}^{CB,ac}, R_{k,C}{}^{CB,bh})$ and $R_{k,C}{}^{JT}$=min $(R_{k,C}{}^{JT,ac}, R_{k,C}{}^{JT,bh})$, respectively.

For the coordinated beamforming transmission mode:
$R_{k,C}{}^{CB}$=min $(R_{k,C}{}^{CB,ac}, R_{k,C}{}^{CB,bh})$, where $$R_{k,C}^{CB,ac} = \sum_{n \in N^{ac}} \alpha_{k,n}^{ac} \log(1 + SINR_{k,n}^{CB,ac}),$$

representing an access data rate obtainable by the user terminal k in the coordinated beamforming transmission mode;

$$R_{k,C}^{CB,bh} = \sum_{n \in N^{bh}} \alpha_{k,n}^{bh} \log(1 + SINR_{k,n}^{CB,bh}),$$

representing a backhaul data rate obtainable by the user terminal k in the coordinated beamforming transmission mode; and $N^{ac}$ and $N^{bh}$ represent an access subchannel set and a backhaul subchannel set that are available to, that is, an access capability and a backhaul capability of, the combination C, respectively; $\alpha_{k,n}^{ac}=1$ indicates that an access subchannel n is allocated to the user terminal k, and $\alpha_{k,n}^{bh}=1$ indicates that a backhaul subchannel n is allocated to the user terminal k, where, on the contrary, $\alpha_{k,n}^{ac}=0$ indicates that the access subchannel n is not allocated to the user terminal k, and $\alpha_{k,n}^{bh}=0$ indicates that the backhaul subchannel n is not allocated to the user terminal k; and $SINR_{k,n}^{CB,ac}$ and $SINR_{k,n}^{CB,bh}$ represent signal-to-noise ratios of the user terminal k on the access subchannel n and the backhaul subchannel n, respectively.

For the joint transmission mode:
$R_{k,C}^{JT}=\min(R_{k,C}^{JT,ac}, R_{k,C}^{JT,bh})$, where $$R_{k,C}^{JT,ac} = \sum_{n \in N^{ac}} \alpha_{k,n}^{ac} \log(1 + SINR_{k,n}^{JT,ac}),$$

representing an access data rate obtainable by the user terminal k in the joint transmission mode;

$$R_{k,C}^{JT,bh} = \sum_{n \in N^{bh}} \alpha_{k,n}^{bh} \log(1 + SINR_{k,n}^{JT,bh}),$$

representing a backhaul data rate obtainable by the user terminal k in the joint transmission mode; and $N^{ac}$ and $N^{bh}$ represent an access subchannel set and a backhaul subchannel set that are available to, that is, an access capability and a backhaul capability of, the combination C, respectively; $\alpha_{k,n}^{ac}=1$ indicates that an access subchannel n is allocated to the user terminal k, and $\alpha_{k,n}^{bh}=1$ indicates that a backhaul subchannel n is allocated to the user terminal k, where, on the contrary, $\alpha_{k,n}^{ac}=0$ indicates that the access subchannel n is not allocated to the user terminal k, and $\alpha_{k,n}^{bh}=0$ indicates that the backhaul subchannel n is not allocated to the user terminal k; and $SINR_{k,n}^{JT,ac}$ and $SINR_{k,n}^{JT,bh}$ represent signal-to-noise ratios of the user terminal k on the access subchannel n and the backhaul subchannel n, respectively.

Similarly, a dual-connectivity transmission mode may be used. For base stations in a coordinating set that participate in dual-connectivity transmission, the foregoing calculation for a non-coordinated transmission mode is used.

For example, for a coordinating set having three base stations, combinations include {base station 1}, {base station 2}, {base station 3}, {base station 1, base station 2}, {base station 1, base station 3}, {base station 2, base station 3}, and {base station 1, base station 2, base station 3}. For one of the combinations, {base station 1, base station 3}, sums of data rates obtainable by all user terminals of the coordinating set in the non-coordinated mode, in the coordinated beamforming mode, in the joint transmission mode, and in the dual-connectivity mode are calculated separately. If a sum of data rates that is obtainable in the joint transmission mode is the largest, an optimal coordinated transmission mode for the combination {base station 1, base station 3} is joint transmission. For other combinations {base station 1, base station 2}, {base station 2, base station 3}, and {base station 1, base station 2, base station 3}, calculation is performed separately in the foregoing manner. For the combinations {base station 1}, {base station 2}, and {base station 3}, because there is only one base station in each combination, only a sum of data rates that is obtainable in the non-coordinated transmission mode is calculated. In the foregoing embodiment, a transmission mode in which a sum of throughputs that is obtainable by the user terminal of the coordinating set is the largest is an optimal coordinated transmission mode for the combination.

By using the foregoing calculation method, an optimal access and backhaul joint utility U value is obtained by calculation for each combination. A combination corresponding to an optimal access and backhaul utility U is selected from multiple optimal U values of all combinations. This means that a sum of data rates that is obtainable by the user terminals is the largest when this combination and a corresponding transmission mode are used. Base stations in this combination are transmission points, and the corresponding transmission mode is a transmission mode used by these transmission points to serve the user terminals of the coordinating set. For example, there are seven combinations in total in the foregoing example. Therefore, seven optimal access and backhaul joint utilities U can be obtained by calculation, and then a transmission mode used for a combination corresponding to the largest U in the seven optimal access and backhaul joint utilities is selected, to transmit data to the user terminals.

For example, for a coordinating set having three base stations, among all combinations {base station 1}, {base station 2}, {base station 3}, {base station 1, base station 2}, {base station 1, base station 3}, {base station 2, base station 3}, and {base station 1, base station 2, base station 3}, if an access and backhaul utility U value of the combination {base station 1, base station 2} is the largest, and a corresponding transmission mode is the joint transmission mode, the base station 1 and the base station 2 are transmission points, the base station 1 and the base station 2 transmit data to the user terminals by using the joint transmission mode, and the base station 3 does not participate in data transmission.

If a U value of the combination {base station 1, base station 3} is the largest, and a corresponding transmission mode is the beamforming transmission mode, the base station 1 and the base station 3 are transmission points, the base station 1 and the base station 3 transmit data to the user terminals by using the beamforming transmission mode, and the base station 2 does not participate in data transmission.

If a U value of the combination {base station 1} is the largest, and a corresponding transmission mode is the non-coordinated transmission mode, that is, single-point transmission, the base station 1 directly transmits data to the user terminals.

In the foregoing embodiment, if only the combinations including two or more base stations are retained, single-point transmission does not exist, and only the joint transmission mode, the beamforming transmission mode, or the dual-connectivity transmission exists.

In addition, in another implementation, by using the foregoing method for calculating an access and backhaul joint utility U value, an access and backhaul joint utility U value can be obtained for each transmission mode of each combination. For example, for a coordinating set having three base stations, combinations include {base station 1}, {base station 2}, {base station 3}, {base station 1, base station 2}, {base station 1, base station 3}, {base station 2, base station 3}, and {base station 1, base station 2, base station 3}. For the combinations including only one base station, which are {base station 1}, {base station 2}, {base station 3}, a sum of data rates that is obtainable by all user terminals of the coordinating set by using the non-coordinated mode is calculated, to obtain three U values. For the combinations including at least two base stations, which are {base station 1, base station 2}, {base station 1, base station 3}, {base station 2, base station 3}, and {base station 1, base station 2, base station 3}, sums of data rates that are obtainable by all user terminals of the coordinating set by using the beamforming mode, the joint transmission mode, and the dual-connectivity mode are calculated for each combination, to obtain 12 U values in total. In this way, 15 U values are obtained for all combinations. Then, the largest U value is selected from the 15 U values. Therefore, a transmission mode and a combination that are corresponding to the largest U value is a transmission mode and a combination to be finally used.

103. Instruct a wireless access point in the combination to use the transmission mode to transmit data to the user terminal of the coordinating set.

That is, a base station in the combination is notified of the transmission mode to be used by the base station, so that the base station (that is, a transmission point) transmits data to the user terminal of the coordinating set in the transmission mode.

For example, if a U value of the combination {base station 1, base station 3} is the largest, and a corresponding transmission mode is the beamforming transmission mode, the base station 1 and the base station 3 are notified that a transmission mode to be used by the base station 1 and the base station 3 is the beamforming transmission mode, and the base station 1 and the base station 3 transmit data to the user terminal by using the beamforming transmission mode.

In step 102, when the optimal access and backhaul joint utility U is determined, corresponding allocation of access and backhaul resource is determined. That is, allocation of access subchannels and backhaul subchannels available to base stations in the combination is determined. Therefore, in step 103, the corresponding base stations are notified of an allocation result of access subchannels and backhaul subchannels available to the base stations in the combination.

Similar to the foregoing step, this step may be completed by a base station or a controller.

Figure 4:
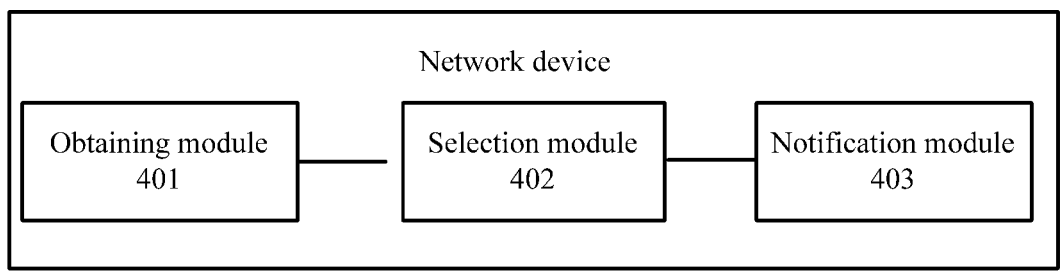
FIG. 4 is a schematic structural diagram of modules of an apparatus for selecting a transmission mode according to an embodiment of the present invention.

Based on the foregoing method embodiment, the present invention further discloses an apparatus for selecting a transmission mode, which is configured to execute the foregoing method. Referring to FIG. 4, the apparatus includes:

an obtaining module 401, configured to obtain a coordinating set of a user terminal and multiple combinations of multiple wireless access points in the coordinating set;

a selection module 402, configured to select, from the multiple combinations, a combination corresponding to a transmission mode having an optimal access and backhaul joint utility; and a notification module 403, configured to instruct a wireless access point in the combination to use the transmission mode having the optimal access and backhaul joint utility to transmit data to the user terminal of the coordinating set.

Figure 5:
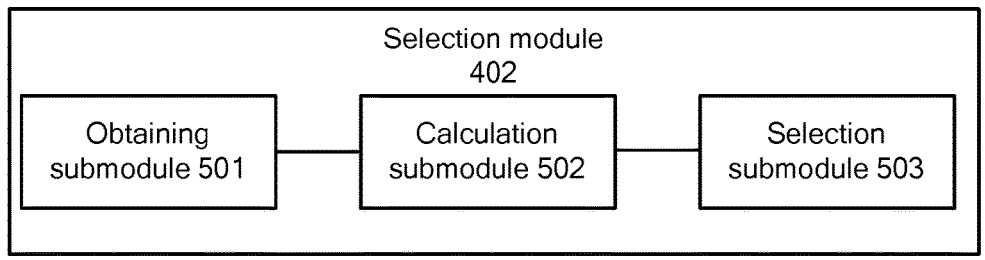
FIG. 5 is a schematic structural diagram of a selection module of an apparatus for selecting a transmission mode according to an embodiment of the present invention.

Referring to FIG. 5, the selection module 402 includes:
an obtaining submodule 501, configured to obtain an access capability and a backhaul capability of each wireless access point;

a calculation submodule 502, configured to calculate, for each combination according to an access capability and a backhaul capability of a wireless access point in the combination, access and backhaul joint utilities of the combination in various transmission modes respectively, to obtain access and backhaul joint utilities of the multiple combinations in different transmission modes; and a selection submodule 503, configured to: select the optimal access and backhaul joint utility from all the obtained access and backhaul joint utilities, and determine the transmission mode and the combination that are corresponding to the optimal access and backhaul joint utility.

Alternatively, the selection module 402 includes:
an obtaining submodule 501, configured to obtain an access capability and a backhaul capability of each wireless access point;

a calculation submodule 502, configured to: calculate, for each combination according to an access capability and a backhaul capability of a wireless access point in the combination, access and backhaul joint utilities of the combination in various transmission modes respectively, and determine a transmission mode that is corresponding to an optimal access and backhaul joint utility of the combination; and a selection submodule 503, configured to select, from transmission modes that are corresponding to multiple optimal access and backhaul joint utilities of the multiple combinations, the combination corresponding to the transmission mode having the optimal access and backhaul joint utility.

A function of the obtaining submodule 501 may alternatively be implemented by the obtaining module 401.

The calculating, for each combination according to an access capability and a backhaul capability of a wireless access point in the combination, access and backhaul joint utilities of the combination in various transmission modes respectively includes:

calculating, for each combination according to an access subchannel set and a backhaul subchannel set that are available to the wireless access point in the combination, a sum of data rates that is obtainable when all user terminals of the coordinating set use each transmission mode.

The calculating, for each combination according to an access subchannel set and a backhaul subchannel set that are available to the wireless access point in the combination, a sum of data rates that is obtainable when all user terminals of the coordinating set use each transmission mode includes:

$$U = \sum_{k \in K_S} R_{k,C},$$

where
S is a set of combinations of wireless access points in the coordinating set; C is a combination of wireless access points in the coordinating set; $K_S$ is a set of user terminals of the coordinating set; and $R_{k,C}$ is a data rate of a user terminal k in a transmission mode in the combination C, where
$R_{k,C} = \min(R_{k,C}^{ac}, R_{k,C}^{bh})$, where $$R_{k,C}^{ac} = \sum_{n \in N^{ac}} \alpha_{k,n}^{ac} \log(1 + SINR_{k,n}^{ac}),$$

representing an access data rate obtainable by the user terminal k in the transmission mode;

$$R^{bh}_{k,C} = \sum_{n \in N^{bh}} \alpha^{bh}_{k,n} \log(1 + SINR^{bh}_{k,n}),$$

representing a backhaul data rate obtainable by the user terminal k in the transmission mode; and $N^{ac}$ and $N^{bh}$ represent an access subchannel set and a backhaul subchannel set that are available to the combination C, respectively; $SINR_{k,n}{}^{ac}$ and $SINR_{k,n}{}^{bh}$ represent signal-to-noise ratios of the user terminal k on an access subchannel n and a backhaul subchannel n, respectively; and $\alpha_{k,n}{}^{ac}=1$ indicates that the access subchannel n is allocated to the user terminal k, and $\alpha_{k,n}{}^{bh}=1$ indicates that the backhaul subchannel n is allocated to the user terminal k.

The notification module 403 is further configured to:

determine access resource subchannel allocation and backhaul resource subchannel allocation that are corresponding to the combination having the optimal access and backhaul joint utility, and notify each wireless access point in the combination of the access resource subchannel allocation and the backhaul resource subchannel allocation.

The transmission mode includes at least one of the following: a non-coordinated transmission mode, a beamforming transmission mode, a joint transmission mode, or a dual-connectivity transmission mode.

The foregoing apparatus embodiment is corresponding to the method embodiment, and corresponding function modules of the apparatus perform corresponding steps of the method embodiment respectively. Some steps are not listed, and reference may be made to the method embodiment. The apparatus may be a wireless access point such as a base station, or may be a base station controller or another network device, or is a separate controller. The controller may be a function entity that is integrated into another network element such as an MME (Mobility Management Element).

Figure 8:
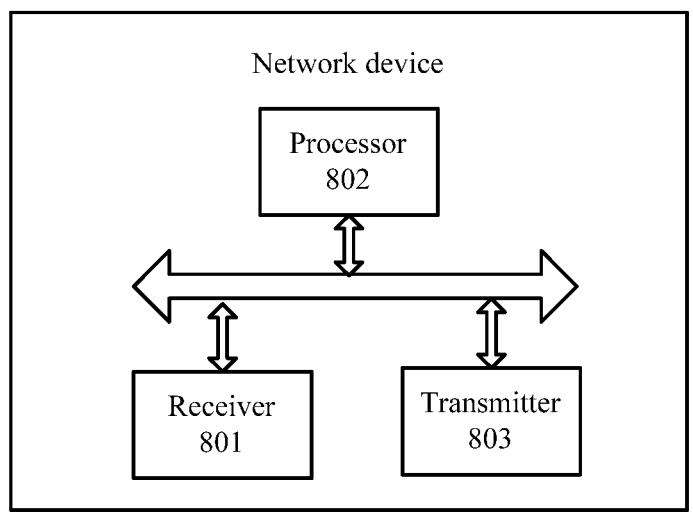
FIG. 8 is a schematic structural diagram of a network device according to another embodiment of the present invention.

The present invention further discloses an apparatus for selecting a transmission mode, which is configured to execute the foregoing method. Referring to FIG. 8, the apparatus includes:

a receiver 801, configured to obtain a coordinating set of a user terminal and multiple combinations of multiple wireless access points in the coordinating set;

a processor 802, configured to select, from the multiple combinations, a combination corresponding to a transmission mode having an optimal access and backhaul joint utility; and a transmitter 803, configured to instruct a wireless access point in the combination to use the transmission mode having the optimal access and backhaul joint utility to transmit data to the user terminal of the coordinating set.

The apparatus is similar to the foregoing apparatus embodiment. The receiver performs the corresponding step of the obtaining module, the processor performs the corresponding step of the selection module, and the transmitter performs the corresponding step of the notification module. Other corresponding steps are also completed by the three units and are not listed one by one. Reference may be made to the foregoing method embodiment and apparatus embodiment. The apparatus may be a wireless access point such as a base station, or may be a base station controller, or is a separate controller. The controller may be a function entity that is integrated into another network element such as an MME (Mobility Management Element).

According to the method and the apparatus for selecting a transmission mode that are described in the foregoing embodiments, when a coordinating set of a user terminal is determined, optimal access and backhaul joint utilities of different transmission modes respectively are calculated for multiple combinations of wireless access points, a transmission mode and a combination that are corresponding to an optimal access and backhaul joint utility are selected, a wireless access point in the combination is instructed to use the transmission mode to transmit data to the user terminal of the coordinating set. This improves data transmission efficiency, and further ensures proper allocation of access and backhaul resources and improves system resource utilization.

The method and the apparatus disclosed in the foregoing embodiments describe how an optimal combination and an optimal transmission mode are selected for multiple wireless access points in the case of one coordinating set. Another embodiment of the present invention further provides a method for allocating access and backhaul resources. Assuming that there are multiple coordinating sets in a network and that a transmission mode of each coordinating set is determined, how can optimal allocation of access and backhaul resources in the network be determined? This method mainly addresses a purpose of proper allocation of access and backhaul resources, to improve system resource utilization.

Figure 2:
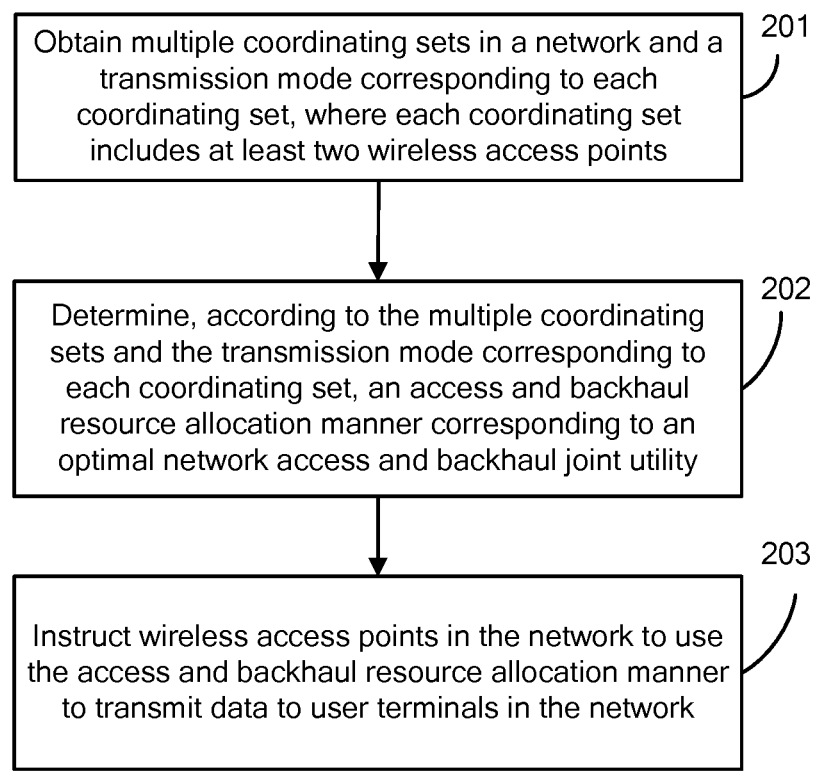
FIG. 2 is a flowchart of a method for allocating access and backhaul resources according to an embodiment of the present invention.

Similar to the foregoing embodiment, the method may be executed by a wireless access point such as a base station, or may be executed by a base station controller, or is executed by a separate controller. The controller may be a function entity that is integrated into another network element such as an MME (Mobility Management Element). Referring to FIG. 2, the method includes the following steps.

201. Obtain multiple coordinating sets of user terminals in a network and a transmission mode of each coordinating set, where each coordinating set includes at least two wireless access points.

The network herein may be an entire network or an area of a network such as a coverage area of multiple base stations, a coverage area of base stations managed by one or more base station controllers, or an area covered by multiple coordinating sets.

This step also determines which wireless access points can be used as wireless access points in the coordinating sets. An implementation of this step is the same as that of step 101, and details are not further described.

An area of a network generally includes multiple user terminals. Each user terminal may determine its own coordinating set. If some user terminals have a same coordinating set, these user terminals are considered as user terminals of the same coordinating set. In addition, it is also possible that some user terminals in the network are unable to find their coordinating sets, and only one base station serves these user terminals.

For a user terminal of a coordinating set, at least two base stations serve the user terminal, and a corresponding transmission mode is a coordinated transmission mode.

Common coordinated transmission modes include a beamforming transmission mode, a joint transmission mode, a dual-connectivity transmission mode, and the like. Each coordinating set may have a determined coordinated transmission mode. For a user terminal of a non-coordinating set, only one base station serves the user terminal, and a corresponding transmission mode is a non-coordinated transmission mode. In this embodiment, it is assumed that the multiple coordinating sets have been determined, and a transmission mode of each coordinating set has also been determined.

202. Determine, according to the multiple coordinating sets and the transmission mode corresponding to each coordinating set, an access and backhaul resource allocation manner corresponding to an optimal network access and backhaul joint utility.

A definition of the access and backhaul joint utility U herein is similar to that in the foregoing embodiment. In this embodiment, in a specific embodiment, the network access and backhaul joint utility is a sum of the following two: a sum of data rates that is obtainable in the transmission mode by user terminals of the coordinating sets in the network, and a sum of data rates that is obtainable by user terminals out of the coordinating sets in the network.

In a specific embodiment, the following formula may be used for calculation:

$$U = \sum R_j = \sum_{S \in C} \sum_{j \in K_S} R_j + \sum_{j \notin K_S, \forall S \in C} R_j,$$

where
S is a coordinating set, C is a set of coordinating sets, and $K_S$ is a set of user terminals of the coordinating set S; and
$R_j$ is a data rate obtainable by a user terminal j; and $$\sum_{S \in C} \sum_{j \in K_S} R_j \text{ and } \sum_{j \notin K_S, \forall S \in C} R_j$$

are a total data rate of user terminals of the coordinating sets and a total data rate of user terminals out of the coordinating sets, respectively.

In a transmission mode, a data rate obtainable by a user terminal of a coordinating set, $j \in K_S$, is:
$R_{j,C} = \min(R_{j,C}^{ac,TM}, R_{j,C}^{bh,TM})$, where
$R_{j,C}^{ac,TM} = W\alpha_j^{ac,TM} \log(1+SINR_j^{ac,TM})$, representing an access data rate obtainable by the user terminal j in the transmission mode;
$R_{j,C}^{bh,TM} = W\alpha_j^{bh,TM} \log(1+SINR_j^{bh,TM})$, representing a backhaul data rate obtainable by the user terminal j in the transmission mode; and
W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $SINR_j^{ac,TM}$ and $SINR_j^{ac,TM}$ represent an access signal-to-noise ratio and a backhaul signal-to-noise ratio of the user terminal j in the transmission mode, respectively.

A data rate obtainable by a user terminal out of the coordinating set, $j \notin K_S$, is:
$R_{j,C} = \min(R_{j,C}^{ac}, R_{j,C}^{bh})$, where
$R_{j,C}^{ac} = W\alpha_j^{ac} \log(1+SINR_j^{ac})$, representing an access data rate obtainable by the user terminal j;
$R_{j,C}^{bh} = W\alpha_j^{bh} \log(1+SINR_j^{bh})$, representing a backhaul data rate obtainable by the user terminal j; and
W is a system bandwidth; $\alpha_j^{ac}$ and $\alpha_j^{bh}$ represent an access resource ratio and a backhaul resource ratio that are allocated to the user terminal j, respectively; and $SINR_j^{ac}$ and $SINR_j^{bh}$ represent an access signal-to-noise ratio and a backhaul signal-to-noise ratio of the user terminal j, respectively.

In the foregoing process of determining a U value, different optimization algorithms may be used, so that the U value is the largest under a specific access and backhaul resource allocation ratio for user terminals. In this case, an access and backhaul resource allocation ratio can be determined for each user terminal.

In a specific implementation, selecting, according to the multiple coordinating sets and the transmission mode corresponding to each coordinating set, an access and backhaul resource allocation manner corresponding to the optimal access and backhaul joint utility includes:
calculating, for different access and backhaul resource allocation ratios for user terminals, according to the multiple coordinating sets and the transmission mode corresponding to each coordinating set, respective sums of data rates that are obtainable by all user terminals in the network, selecting, for each user terminal, an access and backhaul resource allocation ratio corresponding to the largest sum of data rates that is obtainable by all the user terminals in the network, and determining an access resource and a backhaul resource for each wireless access point according to the access and backhaul resource allocation ratio for each user terminal.

The determining an access resource and a backhaul resource for each wireless access point according to the access and backhaul resource allocation ratio for each user terminal is specifically performed by using two methods. One method is to perform calculation for each wireless access point i separately, and a calculation manner is:
an access resource for the wireless access point i:

$$W \sum_{j \in U_i} \alpha_j^{ac} \bigg/ \left( \sum_{j \in U_i} \alpha_j^{ac} + \sum_{j \in U_i} \alpha_j^{bh} \right);$$

and
a backhaul resource for the wireless access point i:

$$W \sum_{j \in U_i} \alpha_j^{bh} \bigg/ \left( \sum_{j \in U_i} \alpha_j^{ac} + \sum_{j \in U_i} \alpha_j^{bh} \right);$$

where
W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i.

The other method is to allocate same access and backhaul resources to all wireless access points, and a calculation manner is:
an access resource for each wireless access point:

$$W \sum_j \alpha_j^{ac} \bigg/ \left( \sum_j \alpha_j^{ac} + \sum_j \alpha_j^{bh} \right);$$

and
a backhaul resource for each wireless access point:

$$W \sum_j \alpha_j^{bh} \bigg/ \left( \sum_j \alpha_j^{ac} + \sum_j \alpha_j^{bh} \right),$$

where

W is a system bandwidth; and $\alpha_j^{ac}$ and $\alpha_j^{bh}$ represent an access resource ratio and a backhaul resource ratio that are allocated to the user terminal j, respectively.

203. Instruct wireless access points in the network to use the access and backhaul resource allocation manner to transmit data to user terminals in the network.

The wireless access points in the network herein may be wireless access points in the foregoing multiple coordinating sets, or may include wireless access points in the entire network, including wireless access points in the multiple coordinating sets and wireless access points out of the coordinating sets in the network.

For the two calculation manners in step 202, a respective access resource and a respective backhaul resource may be indicated to each wireless access point, or a unified access resource and a unified backhaul resource are indicated to all wireless access points.

The transmission mode of each coordinating set in the method may be a beamforming transmission mode, a joint transmission mode, or a dual-connectivity transmission mode.

Figure 6:
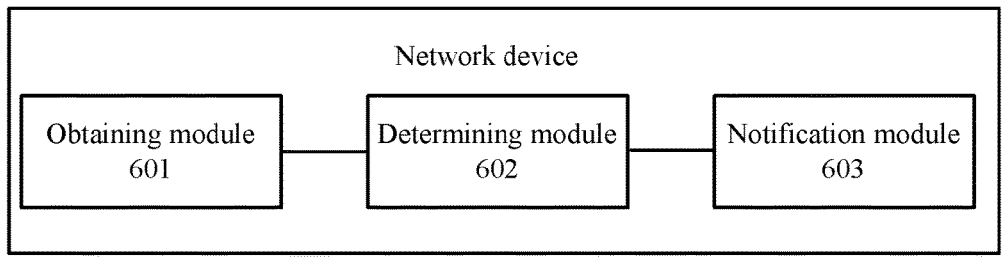
FIG. 6 is a schematic structural diagram of an apparatus for allocating access and backhaul resources according to an embodiment of the present invention.

Based on the foregoing method embodiment, the present invention further discloses an apparatus for allocating access and backhaul resources, which is configured to execute the foregoing method. Referring to FIG. 6, the apparatus includes:

an obtaining module 601, configured to obtain multiple coordinating sets in a network and a transmission mode corresponding to each coordinating set, where each coordinating set includes at least two wireless access points;

a determining module 602, configured to determine, according to the multiple coordinating sets and the transmission mode corresponding to each coordinating set, an access and backhaul resource allocation manner corresponding to an optimal network access and backhaul joint utility; and a notification module 603, configured to instruct wireless access points in the network to use the access and backhaul resource allocation manner to transmit data to user terminals in the network.

The network access and backhaul joint utility is a sum of the following two:

a sum of data rates that is obtainable in the transmission mode by user terminals of the coordinating sets in the network and a sum of data rates that is obtainable by user terminals out of the coordinating sets in the network.

The network access and backhaul joint utility U is calculated in the following manner:

$$U = \sum R_j = \sum_{S \in C} \sum_{j \in K_s} R_j + \sum_{j \notin K_s, \forall S \in C} R_j,$$

where

S is a coordinating set, C is a set of coordinating sets, and $K_S$ is a set of user terminals of the coordinating set S; and $R_j$ is a data rate obtainable by a user terminal j; and $$\sum_{S \in C} \sum_{j \in K_s} R_j \text{ and } \sum_{j \notin K_s, \forall S \in C} R_j$$

are a total data rate of user terminals of the coordinating sets and a total data rate of user terminals out of the coordinating sets, respectively.

In a transmission mode, a data rate obtainable by a user terminal of a coordinating set, $j \in K_S$, is:

$R_{j,C} = \min (R_{j,C}^{ac,TM}, R_{j,C}^{bh,TM})$, where $R_{j,C}^{ac,TM} = W\alpha_j^{ac,TM} \log (1+\text{SINR}_j^{ac,TM})$, representing an access data rate obtainable by the user terminal j in the transmission mode;

$R_{j,C}^{bh,TM} = W\alpha_j^{bh,TM} \log (1+\text{SINR}_j^{bh,TM})$, representing a backhaul data rate obtainable by the user terminal j in the transmission mode; and W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $\text{SINR}_j^{ac,TM}$ and $\text{SINR}_j^{bh,TM}$ represent an access signal-to-noise ratio and a backhaul signal-to-noise ratio of the user terminal j in the transmission mode, respectively.

A data rate obtainable by a user terminal out of the coordinating set, $j \notin K_S$, is:

$R_{j,C} = \min (R_{j,C}^{ac}, R_{j,C}^{bh})$, where $R_{j,C}^{ac} = W\alpha_j^{ac} \log (1+\text{SINR}_j^{ac})$ representing access data rate obtainable by the user terminal j;

$R_{j,C}^{bh} = W\alpha_j^{bh} \log (1+\text{SINR}_j^{bh})$ representing a backhaul data rate obtainable by the user terminal j; and W is a system bandwidth; $\alpha_j^{ac}$ and $\alpha_j^{bh}$ represent an access resource ratio and a backhaul resource ratio that are allocated to the user terminal j, respectively; and $\text{SINR}_j^{ac}$ and $\text{SINR}_j^{bh}$ represent an access signal-to-noise ratio and a backhaul signal-to-noise ratio of the user terminal j, respectively.

The determining module 602 is specifically configured to:

calculate, according to different access and backhaul resource allocation ratios, the multiple coordinating sets, and the transmission mode corresponding to each coordinating set, respective sums of data rates that are obtainable by each user terminal in the network, select, for each user terminal, an access and backhaul resource allocation ratio corresponding to the largest sum of data rates that is obtainable by each user terminal in the network, and determine an access resource and a backhaul resource for each wireless access point according to the access and backhaul resource allocation ratio for each user terminal.

The determining an access resource and a backhaul resource for each wireless access point according to the access and backhaul resource allocation ratio for each user terminal includes calculating the following resources:

an access resource for a wireless access point i:

$$W \sum_{j \in U_i} \alpha_j^{ac} \bigg/ \left( \sum_{j \in U_i} \alpha_j^{ac} + \sum_{j \in U_i} \alpha_j^{bh} \right);$$

and a backhaul resource for the wireless access point i:

$$W \sum_{j \in U_i} \alpha_j^{bh} \bigg/ \left( \sum_{j \in U_i} \alpha_j^{ac} + \sum_{j \in U_i} \alpha_j^{bh} \right),$$

where

W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i; or an access resource for each wireless access point:

$$W \sum_{j} \alpha_j^{ac} \bigg/ \left( \sum_{j} \alpha_j^{ac} + \sum_{j} \alpha_j^{bh} \right);$$

and a backhaul resource for each wireless access point:

$$W \sum_{j} \alpha_j^{bh} \bigg/ \left( \sum_{j} \alpha_j^{ac} + \sum_{j} \alpha_j^{bh} \right),$$

where

W is a system bandwidth; and $\alpha_j^{ac}$ and $\alpha_j^{bh}$ represent an access resource ratio and a backhaul resource ratio that are allocated to the user terminal j, respectively.

The transmission mode of each coordinating set is a beamforming transmission mode, a joint transmission mode, or a dual-connectivity transmission mode.

The foregoing apparatus embodiment is corresponding to the method embodiment, and corresponding modules of the apparatus perform corresponding steps of the method embodiment respectively. Some steps are not listed, and reference may be made to the method embodiment. The apparatus may be a wireless access point such as a base station, or may be a base station controller, or is a separate controller. The controller may be a function entity that is integrated into another network element such as an MME (Mobility Management Element).

The present invention further discloses an apparatus for allocating access and backhaul resources, and the apparatus is configured to perform the foregoing method. Referring to FIG. 8, the apparatus includes:

a receiver 801, configured to obtain multiple coordinating sets in a network and a transmission mode corresponding to each coordinating set, where each coordinating set includes at least two wireless access points;

a processor 802, configured to determine, according to the multiple coordinating sets and the transmission mode corresponding to each coordinating set, an access and backhaul resource allocation manner corresponding to an optimal network access and backhaul joint utility; and a transmitter 803, configured to instruct wireless access points in the network to use the access and backhaul resource allocation manner to transmit data to user terminals in the network.

The apparatus is similar to the foregoing apparatus embodiment. The receiver performs the corresponding step of the obtaining module, the processor performs the corresponding step of the determining module, and the transmitter performs the corresponding step of the notification module. Other corresponding steps are also completed by the three units and are not listed one by one. Reference may be made to the foregoing method embodiment and apparatus embodiment. The apparatus may be a wireless access point such as a base station, or may be a base station controller or another network device, or is a separate controller. The controller may be a function entity that is integrated into another network element such as an MME (Mobility Management Element).

According to the method and the apparatus for allocating access and backhaul resources disclosed in the foregoing embodiments, when multiple coordinating sets in a network and their transmission modes are determined, an access and backhaul resource allocation manner when a network access and backhaul joint utility is optimal is determined, and wireless access points in the network are instructed to use the allocation manner to transmit data to user terminals. This ensures proper and flexible allocation of access and backhaul resources, improves system resource utilization, and further improves data transmission efficiency and a capacity of the network.

A prerequisite of the foregoing embodiment is that multiple coordinating sets in a network have been determined, and that their respective transmission modes have also been determined. In another embodiment, if multiple coordinating sets in a network have been determined, but there are different combinations for corresponding transmission modes, a network access and backhaul joint utility of each combination is calculated for different combinations, an optimal access and backhaul joint utility is selected, and then a combination of transmission modes and an access and backhaul resource allocation manner that are corresponding to the optimal access and backhaul joint utility are selected.

Figure 3:
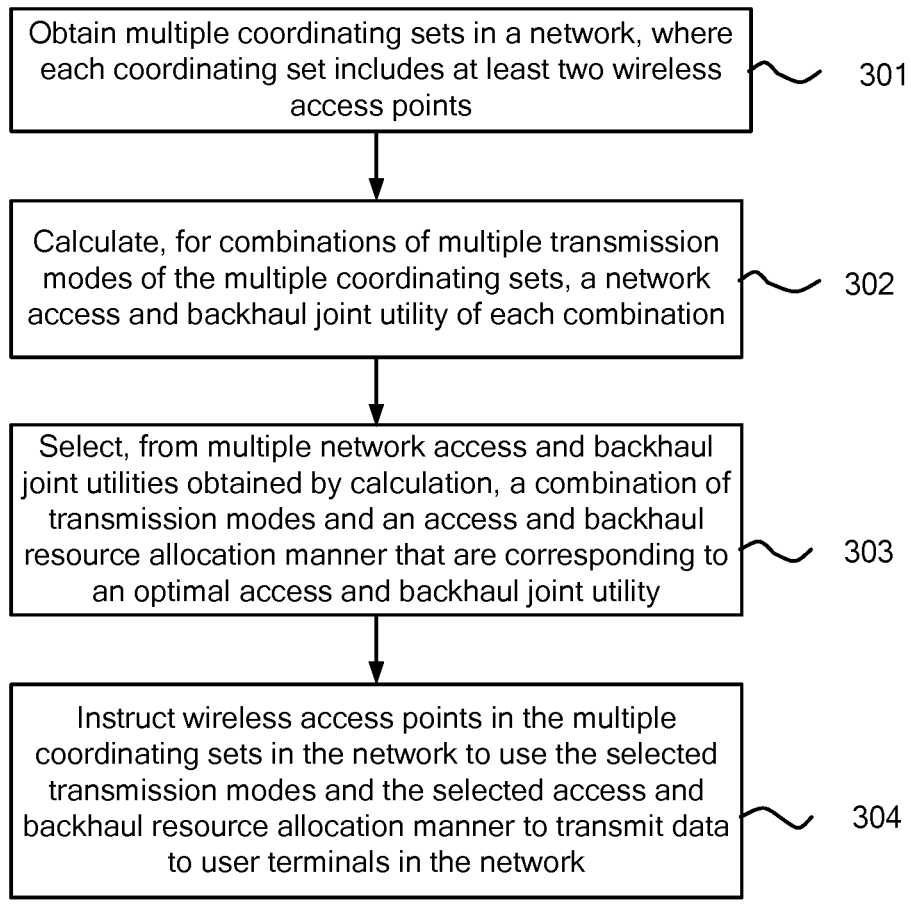
FIG. 3 is a schematic diagram of a method for allocating access and backhaul resources according to another embodiment of the present invention.

A specific algorithm and corresponding executing network elements in this embodiment are all similar to those in the foregoing embodiment. Referring to FIG. 3, the method includes the following steps.

301. Obtain multiple coordinating sets in a network, where each coordinating set includes at least two wireless access points.

This step is similar to that in the foregoing embodiment, and details are not further described.

302. Determine, for combinations of multiple transmission modes of the multiple coordinating sets, a network access and backhaul joint utility of each combination, where optionally, the network access and backhaul joint utility of each combination is an optimal access and backhaul joint utility of the combination.

This specifically includes: calculating, according to different access and backhaul resource allocation ratios of each combination, respective data rates that are obtainable by each user terminal in the network, and selecting, for each user terminal, an access and backhaul resource allocation ratio corresponding to the largest calculated sum of data rates that is obtainable by each user terminal in the network.

It is assumed that there are three coordinating sets and that any one of the following coordinated transmission modes may be selected for each coordinating set: a beamforming transmission mode, a joint transmission mode, and a dual-connectivity transmission mode. Then, the three coordinating sets may have multiple combinations of coordinated transmission modes. The three coordinating sets may select a same transmission mode, or two of the coordinating sets select a same transmission mode, or the three coordinating sets may each select a different transmission mode. All combinations need to be traversed in this embodiment. Then, an access and backhaul joint utility is calculated for each combination, and a combination corresponding to an optimal access and backhaul joint utility is selected.

It is assumed that one of the combinations is:

| Coordinating set | User terminal of the coordinating set | Coordinated transmission mode |
|---|---|---|
| {base station 1, base station 2} | User terminal 1, user terminal 2, and user terminal 3 | Beamforming |
| {base station 1, base station 3} | User terminal 4 and user terminal 5 | Beamforming |
| {base station 2, base station 3} | User terminal 6 | Dual connectivity |

For this combination of transmission modes, an access and backhaul joint utility U can be obtained by using the calculation manner in step 202 in the foregoing embodiment. Then, for another combination such as:

| Coordinating set | User terminal of the coordinating set | Coordinated transmission mode |
|---|---|---|
| {base station 1, base station 2} | User terminal 1, user terminal 2, and user terminal 3 | Beamforming |
| {base station 1, base station 3} | User terminal 4 and user terminal 5 | Joint transmission |
| {base station 2, base station 3} | User terminal 6 | Dual connectivity | a U value is obtained, by calculation, for this combination. Then, another combination is applied. U values are calculated for these different combinations. Then, these U values are compared. The largest U value indicates that a sum of data transmission rates that is obtainable by all user terminals by using the transmission mode and the combination is the largest.

303. Select, from multiple network access and backhaul joint utilities obtained by calculation, a combination of transmission modes and an access and backhaul resource allocation manner that are corresponding to an optimal access and backhaul joint utility.

Specifically, in step 302, a maximum obtainable sum of data rates, U, is obtained, by calculation, for each combination of transmission modes. Then, a combination and an access and backhaul resource allocation ratio for each user terminal that are corresponding to the largest sum of data rates are selected from multiple maximum obtainable sums of data rates, U, corresponding to the multiple combinations, and an access resource and a backhaul resource for each wireless access point are determined according to the access and backhaul resource allocation ratio for each user terminal.

The method for determining the access resource and the backhaul resource for each wireless access point according to the access and backhaul resource allocation ratio for each user terminal is the same as the two calculation manners in step 202, and details are not further described herein.

In step 302, if a U value obtained by calculation in the following combination of transmission modes is the largest, a sum of data rates of all user terminal in this case is the largest.

| Coordinating set | User terminal of the coordinating set | Coordinated transmission mode |
|---|---|---|
| {base station 1, base station 2} | User terminal 1, user terminal 2, and user terminal 3 | Coordinated beamforming |
| {base station 1, base station 3} | User terminal 4 and user terminal 5 | Joint transmission |
| {base station 2, base station 3} | User terminal 6 | Dual connectivity |

Then, corresponding transmission modes are selected for the foregoing three coordinating sets according to the foregoing table.

304. Instruct wireless access points in the multiple coordinating sets to use the selected transmission modes and the selected access and backhaul resource allocation manner to transmit data to the user terminals in the network.

Further, alternatively, the resource allocation manner may be notified to all wireless access points including the wireless access points in the multiple coordinating sets and wireless access points out of the coordinating sets in the network.

In an example, according to the foregoing table, the base stations 1 and 2 transmit data to the user terminals 1, 2, and 3 by using coordinated beamforming, the base stations 1 and 3 transmit data to the user terminals 4 and 5 by using joint transmission, and the base stations 2 and 3 transmit data to the user terminal 6 by using dual connectivity.

Figure 7:
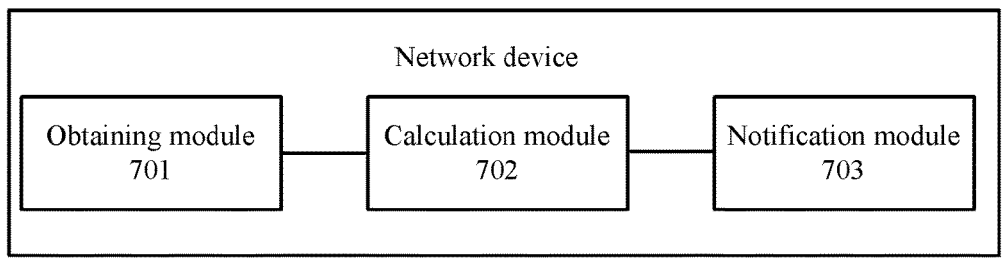
FIG. 7 is a schematic structural diagram of an apparatus for allocating access and backhaul resources according to another embodiment of the present invention.

Based on the foregoing method embodiment, the present invention further discloses an apparatus for allocating access and backhaul resources, which is configured to execute the method in the foregoing embodiment. Referring to FIG. 7, the apparatus includes:

an obtaining module 701, configured to obtain multiple coordinating sets in a network, where each coordinating set includes at least two wireless access points.

a calculation module 702, configured to: calculate, for combinations of multiple transmission modes of the multiple coordinating sets, a network access and backhaul joint utility of each combination; and select, from multiple network access and backhaul joint utilities obtained by calculation, a combination of transmission modes and an access and backhaul resource allocation manner that are corresponding to an optimal access and backhaul joint utility; and a notification module 703, configured to instruct wireless access points in the network to use the selected transmission modes and the selected access and backhaul resource allocation manner to transmit data to user terminals in the network.

The network access and backhaul joint utility of each combination is a sum of the following two:

a sum of data rates that is obtainable in the transmission mode of the combination by user terminals of the coordinating sets in the network and a sum of data rates that is obtainable by user terminals out of the coordinating sets in the network.

The network access and backhaul joint utility is calculated in the following manner:

$$U = \sum R_j = \sum_{S \in C} \sum_{j \in K_s} R_j + \sum_{j \notin K_s, \forall S \in C} R_j,$$

where
- S is a coordinating set, C is a set of coordinating sets, and $K_S$ is a set of user terminals of the coordinating set S; and
- $R_j$ is a data rate obtainable by a user terminal j; and $$\sum_{S \in C} \sum_{j \in K_S} R_j \text{ and } \sum_{j \notin K_S, \forall S \in C} R_j$$

are a total data rate of user terminals of the coordinating sets and a total data rate of user terminals out of the coordinating sets, respectively.

In a transmission mode, a data rate obtainable by a user terminal of a coordinating set, $j \in K_S$, is:
$R_{j,C} = \min(R_{j,C}^{ac,TM}, R_{j,C}^{bh,TM})$, where
$R_{j,C}^{ac,TM} = W\alpha_j^{ac,TM} \log(1+SINR_j^{ac,TM})$, representing an access data rate obtainable by the user terminal j in the transmission mode;
$R_{j,C}^{bh,TM} \log(1+SINR_j^{bh,TM})$ representing a backhaul data rate obtainable by the user terminal j in the transmission mode; and
W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $SINR_j^{ac,TM}$ and $SINR_j^{bh,TM}$ represent an access signal-to-noise ratio and a backhaul signal-to-noise ratio of the user terminal j in the transmission mode, respectively.

A data rate obtainable by a user terminal out of the coordinating set, $j \notin K_S$, is:
$R_{j,C} = \min(R_{j,C}^{ac}, R_{j,C}^{bh})$, where
$R_{j,C}^{ac} = W\alpha_j^{ac} \log(1+SINR_j^{ac})$, representing an access data rate obtainable by the user terminal j;
$R_{j,C}^{bh} = W\alpha_j^{bh} \log(1+SINR_j^{bh})$ representing a backhaul data rate obtainable by the user terminal j; and
W is a system bandwidth; $\alpha_j^{ac}$ and $\alpha_j^{bh}$ represent an access resource ratio and a backhaul resource ratio that are allocated to the user terminal j, respectively; and $SINR_j^{ac}$ and $SINR_j^{bh}$ represent an access signal-to-noise ratio and a backhaul signal-to-noise ratio of the user terminal j, respectively.

The calculating an access and backhaul joint utility of each combination includes:
calculating, according to different access and backhaul resource allocation ratios of each combination, respective data rates that are obtainable by each user terminal in the network, and selecting, for each user terminal, an access and backhaul resource allocation ratio corresponding to the largest calculated sum of data rates that is obtainable by each user terminal in the network.

The selecting, from multiple network access and backhaul joint utilities obtained by calculation, a combination of transmission modes and an access and backhaul resource allocation manner that are corresponding to an optimal access and backhaul joint utility includes:
selecting, from multiple maximum obtainable sums of data rates corresponding to the multiple combinations, a combination and an access and backhaul resource allocation ratio for each user terminal that are corresponding to the largest sum of data rates, and determining an access resource and a backhaul resource for each wireless access point according to the access and backhaul resource allocation ratio for each user terminal.

The determining an access resource and a backhaul resource for each wireless access point according to the access and backhaul resource allocation ratio for each user terminal includes calculating the following resources:
an access resource for a wireless access point i:

$$W \sum_{j \in U_i} \alpha_j^{ac} \Big/ \Big( \sum_{j \in U_i} \alpha_j^{ac} + \sum_{j \in U_i} \alpha_j^{bh} \Big);$$

and
a backhaul resource for the wireless access point i:

$$W \sum_{j \in U_i} \alpha_j^{bh} \Big/ \Big( \sum_{j \in U_i} \alpha_j^{ac} + \sum_{j \in U_i} \alpha_j^{bh} \Big);$$

where
W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i; or
includes calculating the following resources:
an access resource for each wireless access point:

$$W \sum_j \alpha_j^{ac} \Big/ \Big( \sum_j \alpha_j^{ac} + \sum_j \alpha_j^{bh} \Big);$$

and
a backhaul resource for each wireless access point:

$$W \sum_j \alpha_j^{bh} \Big/ \Big( \sum_j \alpha_j^{ac} + \sum_j \alpha_j^{bh} \Big),$$

where
W is a system bandwidth; and $\alpha_j^{ac}$ and $\alpha_j^{bh}$ represent an access resource ratio and a backhaul resource ratio that are allocated to the user terminal j, respectively.

The network access and backhaul joint utility of each combination is an optimal network access and backhaul joint utility of the combination.

The foregoing apparatus embodiment is corresponding to the method embodiment, and corresponding modules of the apparatus perform corresponding steps of the method embodiment respectively. Some steps are not listed, and reference may be made to the method embodiment. The apparatus may be a wireless access point such as a base station, or may be a base station controller, or is a separate controller. The controller may be a function entity that is integrated into another network element such as an MME (Mobility Management Element).

The present invention further discloses an apparatus for allocating access and backhaul resources, and the apparatus is configured to perform the foregoing method. Referring to FIG. 8, the apparatus includes:
a receiver 801, configured to obtain multiple coordinating sets in a network, where each coordinating set includes at least two wireless access points;

a processor 802, configured to: calculate, for combinations of multiple transmission modes of the multiple coordinating sets, a network access and backhaul joint utility of each combination; and select, from multiple network access and backhaul joint utilities obtained by calculation, a combination of transmission modes and an access and backhaul resource allocation manner that are corresponding to an optimal access and backhaul joint utility; and a transmitter 803, configured to instruct wireless access points in the network to use the selected transmission modes and the selected access and backhaul resource allocation manner to transmit data to user terminals in the network.

The apparatus is similar to the foregoing apparatus embodiment. The receiver performs the corresponding step of the obtaining module, the processor performs the corresponding step of the calculation module, and the transmitter performs the corresponding step of the notification module. Other corresponding steps are also completed by the three units and are not listed one by one. Reference may be made to the foregoing method embodiment and apparatus embodiment. The apparatus may be a wireless access point such as a base station, or may be a base station controller or another network device, or is a separate controller. The controller may be a function entity that is integrated into another network element such as an MME (Mobility Management Element).

According to the method and the apparatus for allocating access and backhaul resources, multiple coordinating sets in a network have been determined, but there are different combinations for corresponding transmission modes, a network access and backhaul joint utility of each combination is calculated for the different combinations, an optimal access and backhaul joint utility is selected, and then a combination of transmission modes and an access and backhaul resource allocation manner that are corresponding to the optimal access and backhaul joint utility are selected. This ensures proper and flexible allocation of network access and backhaul resources, improves system resource utilization, and further improves data transmission efficiency and a capacity of the network.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for allocating access and backhaul resources, comprising:

obtaining multiple coordinating sets in a network and a transmission mode corresponding to each coordinating set, wherein each coordinating set comprises at least two wireless access points;

determining, according to the multiple coordinating sets and the transmission mode corresponding to each coordinating set, an access and backhaul resource allocation manner corresponding to an optimal network access and backhaul joint utility; and instructing wireless access points in the network to use the access and backhaul resource allocation manner to transmit data to user terminals in the network wherein the network access and backhaul joint utility is a sum of the following two:

a sum of data rates that is obtainable in the transmission mode by user terminals of the coordinating sets in the network and a sum of data rates that is obtainable by user terminals out of the coordinating sets in the network.

2. The method according to claim 1, wherein the network access and backhaul joint utility U is calculated in the following manner:

$$U = \sum R_j = \sum_{S \in C} \sum_{j \in K_s} R_j + \sum_{j \notin K_s, \forall S \in C} R_j,$$

wherein

S is a coordinating set, C is a set of coordinating sets, and $K_S$ is a set of user terminals of the coordinating set S; and $R_j$ is a data rate obtainable by a user terminal j; and $$\sum_{S \in C} \sum_{j \in K_s} R_j \text{ and } \sum_{j \notin K_s, \forall S \in C} R_j$$

are a total data rate of user terminals of the coordinating sets and a total data rate of user terminals out of the coordinating sets, respectively; and in a transmission mode, a data rate obtainable by a user terminal of a coordinating set, $j \in K_S$, is:

$R_{j,C} = \min(R_{j,C}^{ac,TM}, R_{j,C}^{bh,TM})$, wherein $R_{j,C}^{ac,TM} = W\alpha_j^{ac,TM} \log(1+SINR_j^{ac,TM})$, representing an access data rate obtainable by the user terminal j in the transmission mode;

$R_{j,C}^{bh,TM} = W\alpha_j^{bh,TM} \log(1+SINR_j^{bh,TM})$, representing a backhaul data rate obtainable by the user terminal j in the transmission mode; and W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $SINR_j^{ac,TM}$ and $SINR_j^{bh,TM}$ represent an access signal-to-noise ratio and a backhaul signal-to-noise ratio of the user terminal j in the transmission mode, respectively; or a data rate obtainable by a user terminal out of the coordinating set, $j \notin K_S$, is:

$R_{j,C} = \min(R_{j,C}^{ac}, R_{j,C}^{bh})$ wherein $R_{j,C}^{ac} = W\alpha_j^{ac} \log(1+SINR_j^{ac})$, representing an access data rate obtainable by the user terminal j;

$R_{j,C}^{bh} = W\alpha_j^{bh} \log(1+SINR_j^{bh})$ representing a backhaul data rate obtainable by the user terminal j; and W is a system bandwidth; $\alpha_j^{ac}$ and $\alpha_j^{bh}$ represent an access resource ratio and a backhaul resource ratio that are allocated to the user terminal j, respectively; and SINR$_j^{ac}$ and SINR$_j^{bh}$ represent an access signal-to-noise ratio and a backhaul signal-to-noise ratio of the user terminal j, respectively.

3. The method according to claim 1, wherein the determining, according to the multiple coordinating sets and the transmission mode corresponding to each coordinating set, an access and backhaul resource allocation manner corresponding to an optimal network access and backhaul joint utility:

calculating, for different access and backhaul resource allocation ratios according to the multiple coordinating sets and the transmission mode corresponding to each coordinating set, respective sums of data rates that are obtainable by all user terminals in the network, selecting, for each user terminal, an access and backhaul resource allocation ratio corresponding to the largest sum of data rates that is obtainable by all the user terminals in the network, and determining an access resource and a backhaul resource for each wireless access point according to the access and backhaul resource allocation ratio for each user terminal.

4. The method according to claim 3, wherein the determining an access resource and a backhaul resource for each wireless access point according to the access and backhaul resource allocation ratio for each user terminal comprises:

an access resource for a wireless access point i:

$$W \sum_{j \in U_i} \alpha_j^{ac} \bigg/ \bigg( \sum_{j \in U_i} \alpha_j^{ac} + \sum_{j \in U_i} \alpha_j^{bh} \bigg);$$

and a backhaul resource for the wireless access point i:

$$W \sum_{j \in U_i} \alpha_j^{bh} \bigg/ \bigg( \sum_{j \in U_i} \alpha_j^{ac} + \sum_{j \in U_i} \alpha_j^{bh} \bigg),$$

wherein

W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i.

5. The method according to claim 3, wherein the determining an access resource and a backhaul resource for each wireless access point according to the access and backhaul resource allocation ratio for each user terminal comprises:

an access resource for each wireless access point:

$$W \sum_{j} \alpha_j^{ac} \bigg/ \bigg( \sum_{j} \alpha_j^{ac} + \sum_{j} \alpha_j^{bh} \bigg);$$

and a backhaul resource for each wireless access point:

$$W \sum_{j} \alpha_j^{bh} \bigg/ \bigg( \sum_{j} \alpha_j^{ac} + \sum_{j} \alpha_j^{bh} \bigg),$$

wherein

W is a system bandwidth; and $\alpha_j^{ac}$ and $\alpha_j^{bh}$ represent an access resource ratio and a backhaul resource ratio that are allocated to the user terminal j, respectively.

6. The method according to claim 1, wherein the transmission mode of each coordinating set is a beamforming transmission mode, a joint transmission mode, or a dual-connectivity transmission mode.

7. An apparatus for allocating access and backhaul resources, comprising:

a receiver, configured to obtain multiple coordinating sets in a network and a transmission mode corresponding to each coordinating set, wherein each coordinating set comprises at least two wireless access points;

a processor, configured to determine, according to the multiple coordinating sets and the transmission mode corresponding to each coordinating set, an access and backhaul resource allocation manner corresponding to an optimal network access and backhaul joint utility; and a transmitter, configured to instruct wireless access points in the network to use the access and backhaul resource allocation manner to transmit data to user terminals in the network wherein the network access and backhaul joint utility is a sum of the following two:

a sum of data rates that is obtainable in the transmission mode by user terminals of the coordinating sets in the network and a sum of data rates that is obtainable by user terminals out of the coordinating sets in the network.

8. The apparatus according to claim 7, wherein the network access and backhaul joint utility U is calculated in the following manner:

$$U = \sum R_j = \sum_{S \in C} \sum_{j \in K_S} R_j + \sum_{j \notin K_S, \forall S \in C} R_j,$$

wherein

S is a coordinating set, C is a set of coordinating sets, and $K_S$ is a set of user terminals of the coordinating set S; and $R_j R_j$ is a data rate obtainable by a user terminal j; and $$\sum_{S \in C} \sum_{j \in K_S} R_j \text{ and } \sum_{j \notin K_S, \forall S \in C} R_j$$

are a total data rate of user terminals of the coordinating sets and a total data rate of user terminals out of the coordinating sets, respectively; and in a transmission mode, a data rate obtainable by a user terminal of a coordinating set, $j \in K_S$, is:

$R_{j,C} = \min(R_{j,C}^{ac,TM}, R_{j,C}^{bh,TM})$, wherein $R_{j,C}^{ac,TM} = W\alpha_j^{ac,TM} \log(1+\text{SINR}_j^{ac,TM})$, representing an access data rate obtainable by the user terminal j in the transmission mode;

$R_{j,C}^{bh,TM} = W\alpha_j^{bh,TM} \log(1+\text{SINR}_j^{bh,TM})$, representing a backhaul data rate obtainable by the user terminal j in the transmission mode; and W is a system bandwidth; $\alpha_C^{ac,TM}$ and $\alpha_j^{bh,TM}$ represent an access resource ratio and a backhaul resource ratio that are allocated to the user terminal j in the transmission mode, respectively; and SINR$_j^{ac,TM}$ and $SINR_j^{bh,TM}$ represent an access signal-to-noise ratio and a backhaul signal-to-noise ratio of the user terminal j in the transmission mode, respectively; or a data rate obtainable by a user terminal out of the coordinating set, $j \notin K_S$, is:

$R_{j,C} = \min(R_{j,C}^{ac}, R_{j,C}^{bh})$, wherein $R_{j,C}^{ac} = W\alpha_j^{ac} \log(1+SINR_j^{ac})$, representing an access data rate obtainable by the user terminal j;

$R_{j,C}^{bh} = W\alpha_j^{bh} \log(1+SINR_j^{bh})$, representing a backhaul data rate obtainable by the user terminal j; and W is a system bandwidth; $\alpha_j^{ac}$ and $\alpha_j^{bh}$ represent an access resource ratio and a backhaul resource ratio that are allocated to the user terminal j, respectively; and $SINR_j^{ac}$ and $SINR_j^{bh}$ represent an access signal-to-noise ratio and a backhaul signal-to-noise ratio of the user terminal j, respectively.

9. The apparatus according to claim 7, wherein the processor is configured to:

calculate, for different access and backhaul resource allocation ratios according to the multiple coordinating sets and the transmission mode corresponding to each coordinating set, respective sums of data rates that are obtainable by all user terminals in the network, select, for each user terminal, an access and backhaul resource allocation ratio corresponding to the largest sum of data rates that is obtainable by all the user terminals in the network, and determine an access resource and a backhaul resource for each wireless access point according to the access and backhaul resource allocation ratio for each user terminal.

10. The apparatus according to claim 9, wherein the determining an access resource and a backhaul resource for each wireless access point according to the access and backhaul resource allocation ratio for each user terminal comprises:

an access resource for a wireless access point i:

$$W \sum_{j \in U_i} \alpha_j^{ac} \Big/ \Big( \sum_{j \in U_i} \alpha_j^{ac} + \sum_{j \in U_i} \alpha_j^{bh} \Big);$$

and a backhaul resource for the wireless access point i:

$$W \sum_{j \in U_i} \alpha_j^{bh} \Big/ \Big( \sum_{j \in U_i} \alpha_j^{ac} + \sum_{j \in U_i} \alpha_j^{bh} \Big),$$

wherein

W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i; or an access resource for each wireless access point:

$$W \sum_j \alpha_j^{ac} \Big/ \Big( \sum_j \alpha_j^{ac} + \sum_j \alpha_j^{bh} \Big);$$

and a backhaul resource for each wireless access point:

$$W \sum_j \alpha_j^{bh} \Big/ \Big( \sum_j \alpha_j^{ac} + \sum_j \alpha_j^{bh} \Big),$$

wherein

W is a system bandwidth; $\alpha_j^{ac}$ and $\alpha_j^{bh}$ represent an access resource ratio and a backhaul resource ratio that are allocated to the user terminal j, respectively.

11. The apparatus according to claim 7, wherein the transmission mode of each coordinating set is a beamforming transmission mode, a joint transmission mode, or a dual-connectivity transmission mode.

12. A method for allocating access and backhaul resources, comprising:

obtaining multiple coordinating sets in a network, wherein each coordinating set comprises at least two wireless access points;

calculating, for combinations of multiple transmission modes of the multiple coordinating sets, a network access and backhaul joint utility of each combination;

selecting, from multiple network access and backhaul joint utilities obtained by calculation, a combination of transmission modes and an access and backhaul resource allocation manner that are corresponding to an optimal access and backhaul joint utility; and instructing wireless access points in the network to use the selected transmission modes and the selected access and backhaul resource allocation manner to transmit data to user terminals in the network wherein the network access and backhaul joint utility is a sum of the following two:

a sum of data rates that is obtainable in the transmission mode of the combination by user terminals of the coordinating sets in the network and a sum of data rates that is obtainable by user terminals out of the coordinating sets in the network.

13. The method according to claim 12, wherein the network access and backhaul joint utility U is calculated in the following manner:

$$U = \sum R_j = \sum_{S \in C} \sum_{j \in K_s} R_j + \sum_{j \notin K_s, \forall S \in C} R_j,$$

wherein

S is a coordinating set, C is a set of coordinating sets, and $K_S$ is a set of user terminals of the coordinating set S; and $R_j$ is a data rate obtainable by a user terminal j; and $$\sum_{S \in C} \sum_{j \in K_s} R_j \text{ and } \sum_{j \notin K_s, \forall S \in C} R_j$$

are a total data rate of user terminals of the coordinating sets and a total data rate of user terminals out of the coordinating sets, respectively; and in a transmission mode, a data rate obtainable by a user terminal of a coordinating set, $j \in K_S$, is:

$R_{j,C} = \min(R_{j,C}^{ac,TM}, R_{j,C}^{bh,TM})$, wherein $R_{j,C}^{ac,TM} \leq W\alpha_j^{ac,TM} \log(1+SINR_j^{ac,TM})$, representing an access data rate obtainable by the user terminal j in the transmission mode;

$R_{j,C}^{bh,TM} = W\alpha_j^{bh,TM} \log(1+SINR_j^{bh,TM})$, representing a backhaul data rate obtainable by the user terminal j in the transmission mode; and W is a system bandwidth; $\alpha_j^{ac,TM}$ and $\alpha_j^{bh,TM}$ represent an access resource ratio and a backhaul resource ratio that are allocated to the user terminal j in the transmission mode, respectively; and $SINR_j^{ac,TM}$ and $SINR_j^{bh,TM}$ represent an access signal-to-noise ratio and a backhaul signal-to-noise ratio of the user terminal j in the transmission mode, respectively; or a data rate obtainable by a user terminal out of the coordinating set, $j \in K_S$, is:

$R_{j,C} = \min(R_{j,C}^{ac}, R_{j,C}^{bh})$ wherein $R_{j,C}^{ac} = W\alpha_j^{ac} \log(1+SINR_j^{ac})$, representing an access data rate obtainable by the user terminal j;

$R_{j,C}^{bh} = W\alpha_j^{bh} \log(1+SINR_j^{bh})$, representing a backhaul data rate obtainable by the user terminal j; and W is a system bandwidth; $\alpha_j^{ac}$ and $\alpha_j^{bh}$ represent an access resource ratio and a backhaul resource ratio that are allocated to the user terminal j, respectively; and $SINR_j^{ac}$ and $SINR_j^{bh}$ represent an access signal-to-noise ratio and a backhaul signal-to-noise ratio of the user terminal j, respectively.

14. The method according to the method according to claim 12, wherein the calculating, for combinations of multiple transmission modes of the multiple coordinating sets, a network access and backhaul joint utility of each combination comprises:

calculating, according to different access and backhaul resource allocation ratios of each combination, respective data rates that are obtainable by each user terminal in the network, and selecting, for each user terminal, an access and backhaul resource allocation ratio corresponding to the largest sum of data rates that is obtainable by each user terminal in the network.

15. The method according claim 14, wherein the selecting, from multiple network access and backhaul joint utilities obtained by calculation, a combination of transmission modes and an access and backhaul resource allocation manner that are corresponding to an optimal access and backhaul joint utility comprises:

selecting, from multiple maximum obtainable sums of data rates corresponding to the multiple combinations, a combination and an access and backhaul resource allocation ratio for each user terminal that are corresponding to the largest sum of data rates, and determining an access resource and a backhaul resource for each wireless access point according to the access and backhaul resource allocation ratio for each user terminal.

16. The method according to claim 14, wherein the determining an access resource and a backhaul resource for each wireless access point according to the access and backhaul resource allocation ratio for each user terminal comprises:

an access resource for a wireless access point i:

$$W \sum_{j \in U_i} \alpha_j^{ac} \bigg/ \left( \sum_{j \in U_i} \alpha_j^{ac} + \sum_{j \in U_i} \alpha_j^{bh} \right);$$

and a backhaul resource for the wireless access point i:

$$W \sum_{j \in U_i} \alpha_j^{bh} \bigg/ \left( \sum_{j \in U_i} \alpha_j^{ac} + \sum_{j \in U_i} \alpha_j^{bh} \right);$$

wherein

W is a system bandwidth; $\alpha_j^{ac}$ and $\alpha_j^{bh}$ represent an access resource ratio and a backhaul resource ratio that are allocated to the user terminal j, respectively; and $U_i$ is a set of user terminals served by the wireless access point i; or comprises:

an access resource for each wireless access point:

$$W \sum_{j} \alpha_j^{ac} \bigg/ \left( \sum_{j} \alpha_j^{ac} + \sum_{j} \alpha_j^{bh} \right);$$

and a backhaul resource for each wireless access point:

$$W \sum_{j} \alpha_j^{bh} \bigg/ \left( \sum_{j} \alpha_j^{ac} + \sum_{j} \alpha_j^{bh} \right);$$

wherein

W is a system bandwidth; and $\alpha_j^{ac}$ and $\alpha_j^{bh}$ represent an access resource ratio and a backhaul resource ratio that are allocated to the user terminal j, respectively.

17. The method according to claim 12, wherein the network access and backhaul joint utility of each combination is an optimal network access and backhaul joint utility of the combination.

* * * * *